United States Patent
Ren et al.

(10) Patent No.: US 12,549,971 B2
(45) Date of Patent: Feb. 10, 2026

(54) CONFIGURING A MULTI-MODEL MACHINE LEARNING APPLICATION

(71) Applicant: QUALCOMM INCORPORATED, San Diego, CA (US)

(72) Inventors: Yuwei Ren, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 18/549,750

(22) PCT Filed: Jun. 2, 2021

(86) PCT No.: PCT/CN2021/097834
§ 371 (c)(1),
(2) Date: Sep. 8, 2023

(87) PCT Pub. No.: WO2022/252140
PCT Pub. Date: Dec. 8, 2022

(65) Prior Publication Data
US 2024/0163694 A1    May 16, 2024

(51) Int. Cl.
*H04L 12/00*    (2006.01)
*H04L 41/16*    (2022.01)
*H04W 24/02*    (2009.01)

(52) U.S. Cl.
CPC ............. *H04W 24/02* (2013.01); *H04L 41/16* (2013.01)

(58) Field of Classification Search
CPC ....... H04W 24/02; H04L 41/16; G06N 3/098; G06N 3/0455; G06N 3/096

USPC .......................................................... 370/328
See application file for complete search history.

(56) References Cited

U.S. PATENT DOCUMENTS

| | | | |
|---|---|---|---|
| 11,363,514 B2 * | 6/2022 | Lee | H04W 36/22 |
| 2019/0108417 A1 * | 4/2019 | Talagala | G06F 18/217 |
| 2020/0401945 A1 | 12/2020 | Xu et al. | |
| 2021/0045031 A1 | 2/2021 | Lee et al. | |
| 2023/0379692 A1 * | 11/2023 | Ren | H04L 41/16 |

FOREIGN PATENT DOCUMENTS

| | | | |
|---|---|---|---|
| CN | 111967605 A | 11/2020 | |
| EP | 3742669 A1 * | 11/2020 | G06F 18/23213 |
| WO | WO-2019184836 A1 * | 10/2019 | G06N 20/00 |

(Continued)

OTHER PUBLICATIONS

International Search Report and Written Opinion—PCT/CN2021/097834—ISA/EPO—Mar. 2, 2022.

(Continued)

*Primary Examiner* — Frantz Coby
(74) *Attorney, Agent, or Firm* — Holland & Hart LLP

(57) ABSTRACT

Methods, systems, and devices for wireless communications are described. A user equipment (UE) may receive a control message identifying a backbone model that is combinable with at least one task-specific model to generate a multi-model machine learning application. The UE may receive the backbone model and a first task-specific model identified by the control message. The UE use a multi-model machine learning application that is a combination of the backbone model and the first task-specific model to process one or more received signals to generate one or more outputs. The UE may communicate with a wireless device based on the one or more outputs.

30 Claims, 16 Drawing Sheets

(56) References Cited

FOREIGN PATENT DOCUMENTS

| WO | WO-2019245304 A1 | * | 12/2019 | ............ H04B 17/318 |
| WO | WO-2020080989 A1 | * | 4/2020 | ............. G06N 3/098 |
| WO | WO-2020139181 A1 | * | 7/2020 | ............ H04W 24/02 |
| WO | WO-2023179886 A1 | * | 9/2023 | ............. G06N 20/00 |

OTHER PUBLICATIONS

VIVO: "Discussion on Potential Positioning Enhancements", 3GPP TSG RAN WG1 #102-e, R1-2005381, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051917406, 20 Pages, Paragraph "6 Consideration for NLOS scenario", Section 5, The whole document, pp. 12-13.

Supplementary European Search Report—EP21943509—Search Authority—The Hague—Jan. 21, 2025.

Ye K., et al., "SpotPatch: Parameter-Efficient Transfer Learning for Mobile Object Detection", Jan. 1, 2021, Springer, pp. 239-256, XP047577987, p. 1-p. 2.

* cited by examiner

CONFIGURING A MULTI-MODEL MACHINE LEARNING APPLICATION

CROSS REFERENCE

The present application is a 371 national stage filing of International PCT Application No. PCT/CN2021/097834 by REN et al. entitled "CONFIGURING A MULTI-MODEL MACHINE LEARNING APPLICATION," filed Jun. 2, 2021, which is assigned to the assignee hereof, and which is expressly incorporated by reference in its entirety herein.

FIELD OF TECHNOLOGY

The following relates to wireless communications, including configuring a multi-model machine learning application.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may use machine learning. Improved techniques for enabling machine learning may be desired.

SUMMARY

The described techniques relate to improved methods, systems, devices, and apparatuses that support configuring a multi-model machine learning application. A user equipment (UE) may use a multi-model machine learning application for communications. The multi-model machine learning application may include a backbone model and a task-specific model. The UE may be configured with the backbone model and the task-specific model via one or more control messages from a base station. If one of the models becomes unsuitable for use, the UE may update that model by requesting a new model from the base station or by loading a previously configured model from memory.

A method for wireless communication at a user equipment (UE) is described. The method may include receiving, from a base station, a control message identifying a backbone model and at least one task-specific model, the backbone model being combinable with the at least one task-specific model to generate at least one multi-model machine learning application, receiving, from the base station, the backbone model and a first task-specific model of the at least one task-specific model identified by the control message, processing, by a first multi-model machine learning application that is a combination of the backbone model and the first task-specific model, one or more signals received from the base station to generate one or more outputs, and communicating, with the base station or a wireless device, a first message based on the one or more outputs.

An apparatus for wireless communication at a UE is described. The apparatus may include a processor, memory coupled with the processor, and instructions stored in the memory. The instructions may be executable by the processor to cause the apparatus to receive, from a base station, a control message identifying a backbone model and at least one task-specific model, the backbone model being combinable with the at least one task-specific model to generate at least one multi-model machine learning application, receive, from the base station, the backbone model and a first task-specific model of the at least one task-specific model identified by the control message, process, by a first multi-model machine learning application that is a combination of the backbone model and the first task-specific model, one or more signals received from the base station to generate one or more outputs, and communicate, with the base station or a wireless device, a first message based on the one or more outputs.

Another apparatus for wireless communication at a UE is described. The apparatus may include means for receiving, from a base station, a control message identifying a backbone model and at least one task-specific model, the backbone model being combinable with the at least one task-specific model to generate at least one multi-model machine learning application, means for receiving, from the base station, the backbone model and a first task-specific model of the at least one task-specific model identified by the control message, means for processing, by a first multi-model machine learning application that is a combination of the backbone model and the first task-specific model, one or more signals received from the base station to generate one or more outputs, and means for communicating, with the base station or a wireless device, a first message based on the one or more outputs.

A non-transitory computer-readable medium storing code for wireless communication at a UE is described. The code may include instructions executable by a processor to receive, from a base station, a control message identifying a backbone model and at least one task-specific model, the backbone model being combinable with the at least one task-specific model to generate at least one multi-model machine learning application, receive, from the base station, the backbone model and a first task-specific model of the at least one task-specific model identified by the control message, process, by a first multi-model machine learning application that is a combination of the backbone model and the first task-specific model, one or more signals received from the base station to generate one or more outputs, and communicate, with the base station or a wireless device, a first message based on the one or more outputs.

In some examples of the method, apparatuses, and non-transitory computer-readable medium described herein, receiving the control message may include operations, features, means, or instructions for receiving the control message identifying a backbone model configuration indicating a set of multiple scenarios, conditions, or tasks in which to apply the backbone model and a task-specific configuration for the first task-specific model indicating a first scenario, condition, or task of the set of multiple scenarios, conditions, or tasks in which to combine the first task-specific model with the backbone model to generate the first multi-model machine learning application.

Some examples of the method, apparatuses, and non-transitory computer-readable medium described herein may further include operations, features, means, or instructions for receiving, in the control message, at least one indication of a set of multiple task-specific models and one or more scenarios, conditions, or tasks for combining a respective task-specific model with the backbone model, receiving the set of multiple task-specific models from the base station identified in the control message, and communicating the first message based on a detected scenario, condition, or task indicating to combine the first task-specific model with the backbone model to generate the first multi-model machine learning application.

Some examples of the method, apparatuses, and non-transitory computer-readable medium described herein may further include operations, features, means, or instructions for receiving an update control message identifying a second task-specific model that may be combinable with the backbone model for generating a second multi-model machine learning application, receiving, from the base station, the second task-specific model identified in the update control message, processing, by the second multi-model machine learning application that may be a combination of the backbone model and the second task-specific model, one or more second signals received from the base station to generate one or more second outputs, and communicating a second message based on one or more second outputs.

Some examples of the method, apparatuses, and non-transitory computer-readable medium described herein may further include operations, features, means, or instructions for receiving a second backbone model from the base station or a second base station and an indication that the second backbone model may be combinable with a second task-specific model, processing, by a second multi-model machine learning application that may be a combination of the second backbone model and the second task-specific model, one or more second signals received from the base station or the second base station to generate one or more second outputs, and communicating a second message based on one or more second outputs.

Some examples of the method, apparatuses, and non-transitory computer-readable medium described herein may further include operations, features, means, or instructions for transmitting a request for the second backbone model based on detecting a change in one or more conditions, one or more tasks, one or more scenarios, or any combination thereof.

Some examples of the method, apparatuses, and non-transitory computer-readable medium described herein may further include operations, features, means, or instructions for receiving the second task-specific model from the base station or the second base station.

Some examples of the method, apparatuses, and non-transitory computer-readable medium described herein may further include operations, features, means, or instructions for transmitting a request for the second task-specific model based on detecting a change in one or more conditions, one or more tasks, one or more scenarios, or any combination thereof.

In some examples of the method, apparatuses, and non-transitory computer-readable medium described herein, receiving the control message may include operations, features, means, or instructions for receiving a first control message including a backbone model configuration for the backbone model and receiving a second control message including a task-specific configuration for the first task-specific model, where the one or more signals may be processed by the first multi-model machine learning application in accordance with the backbone model configuration and the task-specific configuration.

In some examples of the method, apparatuses, and non-transitory computer-readable medium described herein, the control message includes an index for the backbone model and the method, apparatuses, and non-transitory computer-readable medium may include further operations, features, means, or instructions for determining that the first task-specific model may be compatible with the backbone model based on the index for the backbone model.

In some examples of the method, apparatuses, and non-transitory computer-readable medium described herein, the control message indicates a task list supported by the backbone model and the method, apparatuses, and non-transitory computer-readable medium may include further operations, features, means, or instructions for processing, by the first multi-model machine learning application, one or more second signals received from the base station to generate one or more second outputs corresponding to a task from the supported task list.

In some examples of the method, apparatuses, and non-transitory computer-readable medium described herein, the task list indicates at least one mobility task, at least one beam management task, or any combination thereof.

In some examples of the method, apparatuses, and non-transitory computer-readable medium described herein, the control message indicates a scenario list supported by the backbone model and the method, apparatuses, and non-transitory computer-readable medium may include further operations, features, means, or instructions for processing, by the first multi-model machine learning application, one or more second signals received from the base station to generate one or more second outputs corresponding to a scenario from the supported scenario list.

In some examples of the method, apparatuses, and non-transitory computer-readable medium described herein, the scenario list indicates at least one cell index, at least one doppler range index, at least one speed index, at least one bandwidth index, at least one port index, or any combination thereof.

Some examples of the method, apparatuses, and non-transitory computer-readable medium described herein may further include operations, features, means, or instructions for transmitting a backbone model update request to the base station or a second base station based on detecting a scenario, a condition, or a task that may be unsupported by the backbone model, receiving a second backbone model and a second task-specific model based on the backbone model update request, processing, by a second multi-model machine learning application that may be a combination of the second backbone model and the second task-specific model, one or more second signals received from the base station or the second base station to generate one or more second outputs, and communicating a second message based on one or more second outputs.

In some examples of the method, apparatuses, and non-transitory computer-readable medium described herein, receiving the control message may include operations, features, means, or instructions for receiving the control message indicating a set of one or more application types supported by the backbone model, a set of one or more tasks supported by the backbone model, a set of one or more conditions for using the backbone model, one or more time periods for using the backbone model, or a combination thereof.

In some examples of the method, apparatuses, and non-transitory computer-readable medium described herein, processing the one or more signals may include operations, features, means, or instructions for processing, using the backbone model, a reference signal or an estimated channel to generate one or more intermediate outputs and processing, using the first task-specific model, the one or more intermediate outputs to generate the one or more outputs.

In some examples of the method, apparatuses, and non-transitory computer-readable medium described herein, receiving the backbone model and the first task-specific model may include operations, features, means, or instructions for receiving an indication of a first structure for the backbone model and a first set of one or more parameters corresponding to the first structure and an indication of a second structure for the first task-specific model and a second set of one or more parameters corresponding to the second structure.

Some examples of the method, apparatuses, and non-transitory computer-readable medium described herein may further include operations, features, means, or instructions for receiving control signaling activating the backbone model and the first task-specific model.

In some examples of the method, apparatuses, and non-transitory computer-readable medium described herein, transmitting the control message may include operations, features, means, or instructions for transmitting the control message indicating a set of one or more application types supported by the backbone model, a set of one or more tasks supported by the backbone model, a set of one or more conditions for using the backbone model, one or more time periods for using the backbone model, or a combination thereof.

In some examples of the method, apparatuses, and non-transitory computer-readable medium described herein, transmitting the backbone model and the first task-specific model may include operations, features, means, or instructions for transmitting an indication of a first structure for the backbone model and a first set of one or more parameters corresponding to the first structure and an indication of a second structure for the first task-specific model and a second set of one or more parameters corresponding to the second structure.

A method for wireless communication at a base station is described. The method may include transmitting, to a UE, a control message identifying a backbone model and at least one task-specific model, the backbone model being combinable with the at least one task-specific model to generate at least one multi-model machine learning application, transmitting, to the UE, the backbone model and a first task-specific model of the at least one task-specific model identified by the control message, and an instruction to combine to the backbone model and the first task-specific model to generate a first multi-model machine learning application, and communicating, with the UE, a first message based on the first multi-model machine learning application.

An apparatus for wireless communication at a base station is described. The apparatus may include a processor, memory coupled with the processor, and instructions stored in the memory. The instructions may be executable by the processor to cause the apparatus to transmit, to a UE, a control message identifying a backbone model and at least one task-specific model, the backbone model being combinable with the at least one task-specific model to generate at least one multi-model machine learning application, transmit, to the UE, the backbone model and a first task-specific model of the at least one task-specific model identified by the control message, and an instruction to combine to the backbone model and the first task-specific model to generate a first multi-model machine learning application, and communicate, with the UE, a first message based on the first multi-model machine learning application.

Another apparatus for wireless communication at a base station is described. The apparatus may include means for transmitting, to a UE, a control message identifying a backbone model and at least one task-specific model, the backbone model being combinable with the at least one task-specific model to generate at least one multi-model machine learning application, means for transmitting, to the UE, the backbone model and a first task-specific model of the at least one task-specific model identified by the control message, and an instruction to combine to the backbone model and the first task-specific model to generate a first multi-model machine learning application, and means for communicating, with the UE, a first message based on the first multi-model machine learning application.

A non-transitory computer-readable medium storing code for wireless communication at a base station is described. The code may include instructions executable by a processor to transmit, to a UE, a control message identifying a backbone model and at least one task-specific model, the backbone model being combinable with the at least one task-specific model to generate at least one multi-model machine learning application, transmit, to the UE, the backbone model and a first task-specific model of the at least one task-specific model identified by the control message, and an instruction to combine to the backbone model and the first task-specific model to generate a first multi-model machine learning application, and communicate, with the UE, a first message based on the first multi-model machine learning application.

In some examples of the method, apparatuses, and non-transitory computer-readable medium described herein, transmitting the control message may include operations, features, means, or instructions for transmitting the control message identifying a backbone model configuration indicating a set of multiple scenarios or tasks in which to apply the backbone model and a task-specific configuration for the first task-specific model indicating a first scenario or task of the set of multiple scenarios or tasks in which to combine the first task-specific model with the backbone model to generate the first multi-model machine learning application.

Some examples of the method, apparatuses, and non-transitory computer-readable medium described herein may further include operations, features, means, or instructions for transmitting an update control message identifying a second task-specific model that may be combinable with the backbone model for generating a second multi-model machine learning application and transmitting, to the UE, the second task-specific model identified in the update control message.

Some examples of the method, apparatuses, and non-transitory computer-readable medium described herein may further include operations, features, means, or instructions for transmitting, in the control message, at least one indication of a set of multiple task-specific models and one or more conditions for combining a respective task-specific model with the backbone model, transmitting the set of multiple task-specific models from the base station identified in the control message, and communicating the first message based on a detected condition indicating to combine the first task-specific model with the backbone model to generate the first multi-model machine learning application.

Some examples of the method, apparatuses, and non-transitory computer-readable medium described herein may further include operations, features, means, or instructions for transmitting a second backbone model to the UE and an indication that the second backbone model may be combinable with a second task-specific model.

In some examples of the method, apparatuses, and non-transitory computer-readable medium described herein, transmitting the control message may include operations, features, means, or instructions for transmitting a first control message including a backbone model configuration for the backbone model and transmitting a second control message including a task-specific configuration for the first task-specific model.

Some examples of the method, apparatuses, and non-transitory computer-readable medium described herein may further include operations, features, means, or instructions for receiving a backbone model update request based on detection of a scenario, a condition, or a task that may be unsupported by the backbone model and transmitting a second backbone model and a second task-specific model based on the backbone model update request.

DETAILED DESCRIPTION

In some wireless communications systems, a user equipment (UE) may use machine learning to improve communications and performance. For example, a UE may use an end-to-end machine learning application that includes multiple layers to perform various tasks. To update the machine learning application (e.g., when conditions change), the UE may download (e.g., receive) another end-to-end machine learning application from a base station. But downloading another end-to-end machine learning application may be inefficient (e.g., due to the size of the application). For example, downloading another end-to-end machine learning application take a lot of time and consume many resources, among other disadvantages, which may negatively impact UE performance.

According to the techniques described herein, a UE may use a multi-model machine learning application that includes at least a backbone model and a task-specific model. When combined, the backbone model may include one or more front-end layers of the multi-model machine learning application and the task-specific model may include one or more back-end layers of the multi-model machine learning application. The task-specific model may operate on intermediate outputs from the backbone model, which may process various features related to the operations of the UE. To update the multi-model machine learning application, the UE may maintain the backbone model (e.g., the backbone model may be static) and replace the task-specific model with a new task-specific model, which may be stored at the UE or downloaded from a base station. If the backbone model becomes unsuitable for use, which may occur less frequently relative to the task-specific model, the UE may separately download a new backbone model. Thus, the UE may update the multi-model machine learning application without downloading another entire multi-model machine learning application, which may allow the UE to conserve time and resources, among other advantages.

A backbone model of a multi-model machine learning application may also be referred to as a base model, a backbone stage, or a base stage, and a task-specific model of a multi-model machine learning application may also be referred to as a task-specific stage, a specific stage, or a specific model.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to configuring a multi-model machine learning application.

Figure 1:
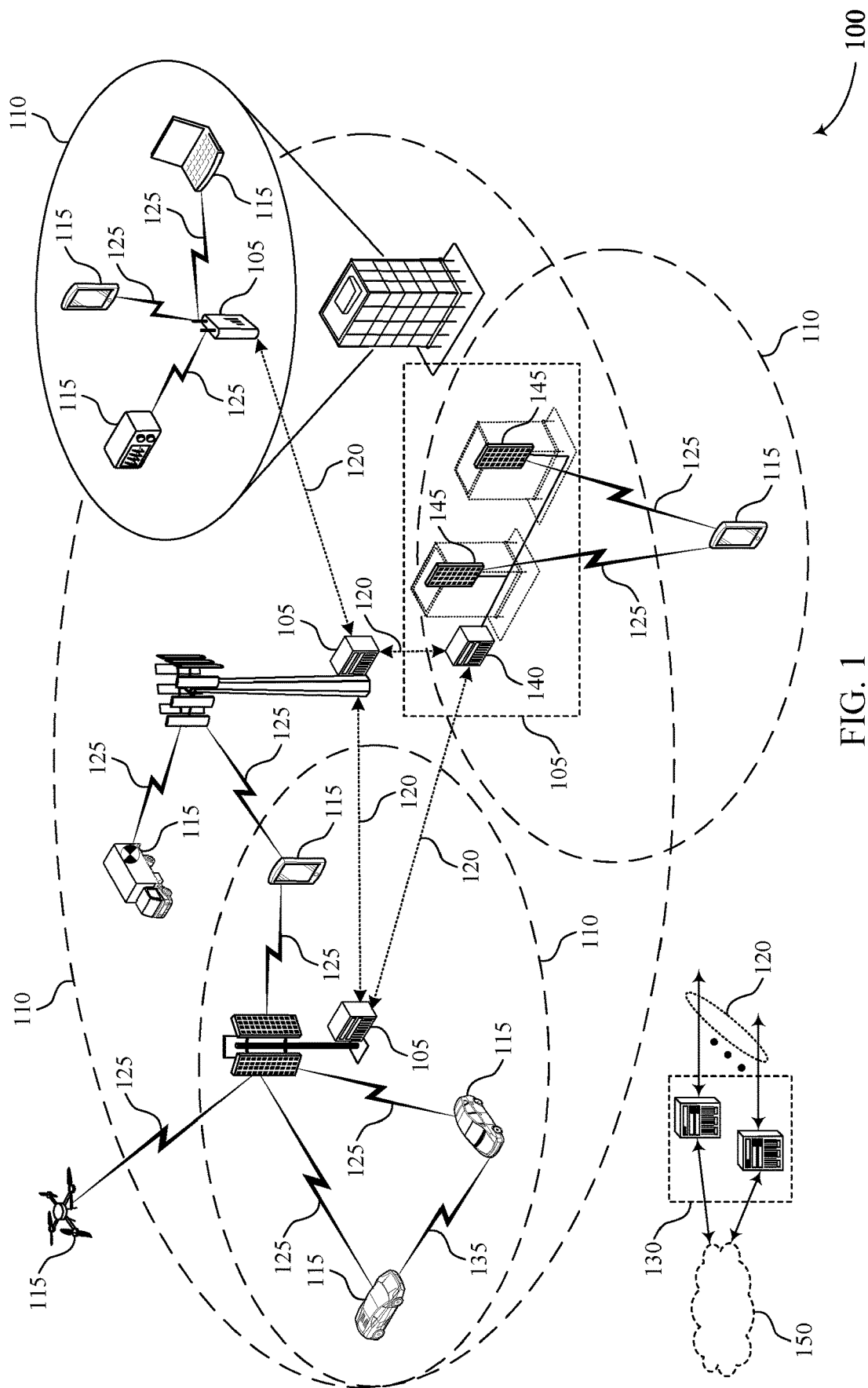
FIG. 1 illustrates an example of a wireless communications system that supports configuring a multi-model machine learning application in accordance with aspects of the present disclosure.

FIG. 1 illustrates an example of a wireless communications system 100 that supports configuring a multi-model machine learning application in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the wireless communications system 100 may be an example of a network, for example a wireless backhaul communications network, such as an IAB network, among other various examples. An IAB network may include an IAB donor (or "anchor") node and one or more relay (or "intermediate") nodes downstream from the donor node. An IAB network may share resources between access and backhaul links such that access traffic may be relayed on a wireless backhaul link. In some cases, the same technology and techniques may be used for access links and backhaul links. IAB donor nodes may provide access to child UEs and the wireless backhaul functionality to IAB nodes. An IAB donor may include a CU for control of the IAB-network and one or more DUs for scheduling IAB nodes. An IAB donor may have a wireline connection to the core network 130. Downstream from the IAB donor node the network may include one or more IAB nodes (also referred to as one or more of parent nodes, relay nodes, intermediate nodes, or child nodes, depending upon where the node is within the IAB network) within the IAB network, with each wirelessly relaying traffic of one or more other nodes, such as its child nodes (e.g., UEs, or other IAB nodes), to one or more other nodes, such as the parent node (e.g., IAB donor, or IAB node). A UE 115 may connect wirelessly to an IAB donor node that is within range of the UE 115. In some cases, a base station 105 may be an example of a donor IAB node.

An IAB donor node may be functionally split into associated base station central unit (CU) and distributed unit (DU) entities (or "functions"), where one or more DUs associated with an IAB donor node may be partially controlled by an associated CU. CUs of IAB donor nodes may host layer 3 (L3) (e.g., RRC, service data adaption protocol (SDAP), PDCP) functionality and signaling. Further, CUs of IAB donor nodes may communicate with the core network over a wireline backhaul link (e.g., which may be referred to as an NG interface). DUs may host lower layer operations, such as layer 1 (L1) or layer 2 (L2) (e.g., RLC, MAC, physical layer) functionality and signaling. A DU entity of an IAB donor node may support a serving cell within the network coverage area according to connections associated with wireless backhaul links and access links of the IAB network. DUs of the IAB donor nodes may control both access and backhaul links within the corresponding network coverage and may provide controlling and scheduling for descendant (i.e., child, relay) IAB nodes and or UEs 115. For example, a DU may support an RLC channel connection with a UE 115 (e.g., via an access link) or with an IAB node (e.g., via a backhaul link, such as a primary wireless backhaul link or a backup wireless backhaul link). A DU of a node may be responsible for relaying (e.g., transporting, forwarding) messages from another node (e.g., to a CU and/or the core network) so that the other node can register with the core network and establish a secure radio resource control (RRC) connection with the CU of a donor node.

In some examples, a UE 115 may implement machine learning techniques to improve performance. For example, a UE 115 may use an end-to-end machine learning application to perform mobility management, to perform beam management, or to report channel state information (CSI) feedback (CSF), among other operations. The machine learning application used by a UE 115 may be received from a base station 105. To update the machine learning application (e.g., to accommodate new conditions or perform new tasks), the UE 115 may receive another end-to-end machine learning application from the base station 105. But signaling a new end-to-end machine learning application may take a lot of time and consume many resources (e.g., communication resources, processing resources).

According to the techniques described herein, a UE 115 may enable efficient machine learning application updates by using a multi-model machine learning application. For example, the UE 115 may efficiently update a multi-model machine learning application by separately updating one or more models of the multi-model machine learning application (e.g., a task-specific model) while retaining one or more other models of the multi-model machine learning application (e.g., the backbone model) as-is.

Figure 2:
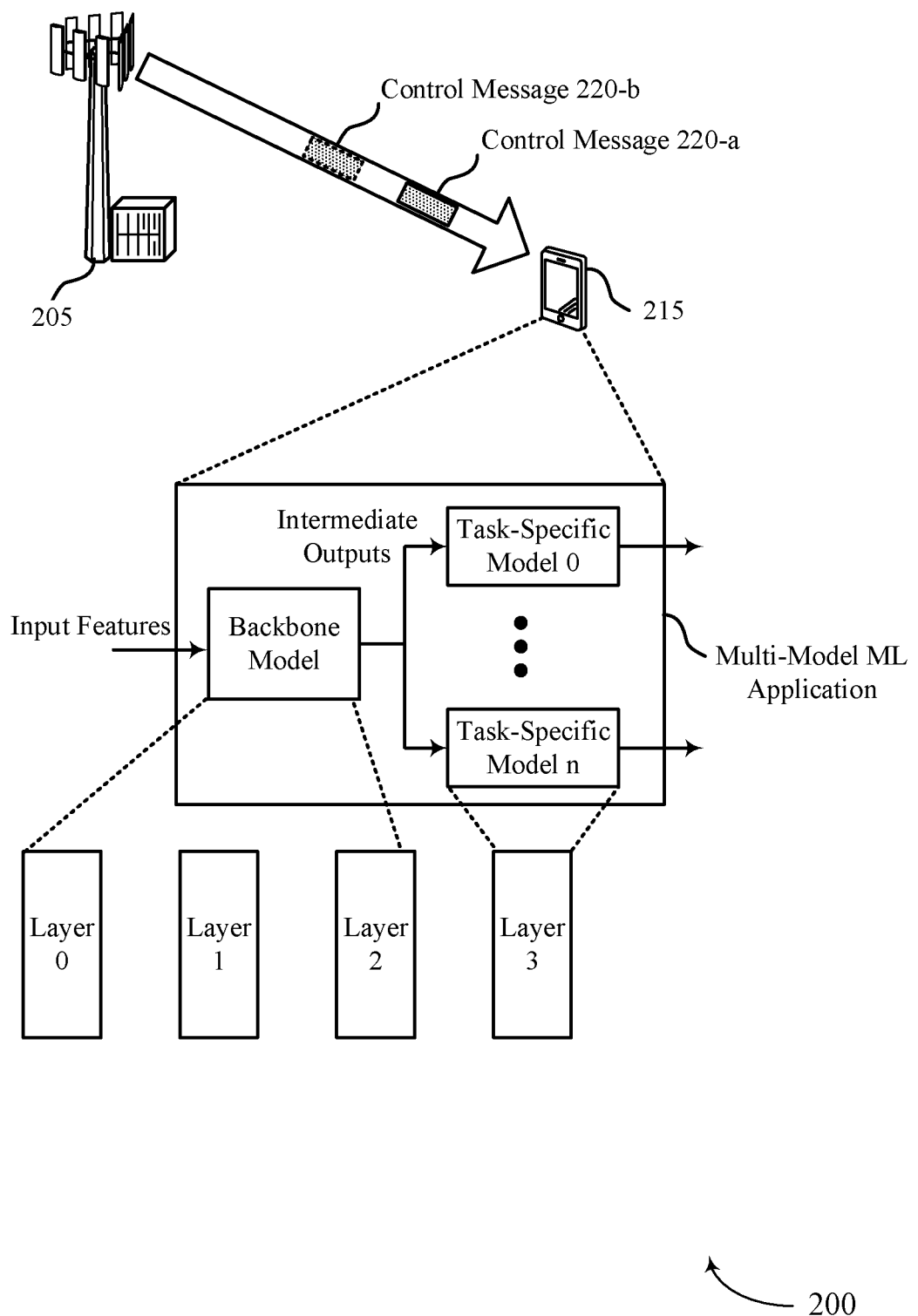
FIG. 2 illustrates an example of a wireless communications system that supports configuring a multi-model machine learning application in accordance with aspects of the present disclosure.

FIG. 2 illustrates an example of a wireless communications system 200 that supports configuring a multi-model machine learning application in accordance with aspects of the present disclosure. The wireless communications system 200 may include a base station 205 and a UE 215, which may be examples of a base station 105 and a UE 115, respectively, as described with reference to FIG. 1. The base station 205 and the UE 215 may implement aspects of the techniques described herein so that the UE 215 can efficiently update machine learning applications.

The UE 215 may use one or more multi-model machine learning applications, each of which may include a backbone model and one or more task-specific models. In some examples, a multi-model machine learning application may be built by the UE 215 and the base station 205 working together (e.g., as a neural network, such as a deep neural network). For example, to build a machine learning application for CSF reporting the UE 215 may serve as an encoder in the neural network and the base station 205 may serve as the decoder in the neural network. As the encoder, the UE 215 may use the characteristics of an estimated channel as input features for the machine learning and may communicate feedback generated by the machine learning to the base station 205, which, as the decoder, may output latent code based on the feedback. Different channel types may be associated with different task-specific models.

A backbone model may include one or more layers (e.g., algorithms), each of which may have a corresponding set of parameters (e.g., coefficients, ratios, weights, weight sets). For example, the backbone model shown in FIG. 2 may include three layers (front-end layers 0 through 2), each of which may have a corresponding set of parameters. A layer may also be referred to as a block or other suitable terminology, and the layers that make up a model may be referred to as the structure of the model. The backbone model may operate on various input features (e.g., data, information) associated with operations of the UE 215 and may generate various intermediate outputs based on the input features. According to the techniques described herein, the wireless communications system 200 may pre-train the backbone model and fix the backbone model (e.g., maintain the backbone model as-is) for use with various task-specific models during an application update. Such a technique may be more efficient than re-training and downloading the backbone model each time an update is performed.

The task-specific models may also be made up of one or more layers (e.g., back-end layers), each of which may have a corresponding set of parameters. The task-specific models may operate on intermediate outputs from the backbone model and may generate one or more outputs that the UE 215 can use for various operations. As an example, the backbone model may operate on channel information (e.g., reference signal characteristics, estimated channel characteristics) and generate intermediate outputs that the task-specific models can use to perform angle estimation or precoder generation. The UE 215 may then use the estimated angle, generated precoder, or both for communication of a message with the base station 205. According to the techniques described herein, the wireless communications system 200 may train, optimize, and download one or more task-specific models during an application update, which may be more efficient than training, optimizing, and downloading both models.

Thus, a backbone model and a task-specific model may collectively form an end-to-end machine learning application. The backbone model may support various operations (e.g., beam management, mobility management, CSF reporting) and a task-specific model may support a specific task for an operation. Further, each model may be associated with a corresponding set of conditions with which that model is compatible or capable of properly functioning.

In some examples, the UE 215 may use a multi-model machine learning application that includes three or more models. For example, the UE 215 may use a three-model machine learning application that includes a backbone model, a task-specific model, and an intermediate model between the backbone model and the task-specific model. The intermediate model may also be referred to as a neck model. Although described with reference to two-model applications, the techniques described herein may be applied to multi-model machine learning applications with different quantities of models.

The base station 205 may configure the UE 215 with an end-to-end multi-model machine learning application by configuring the UE 215 with one or more backbone models and one or more task-specific models. For example, base station 205 may transmit to UE 215 a backbone model of a multi-model machine learning application a task-specific model for the multi-model machine learning application. A model may include the structure for the model as well as corresponding parameters sets (e.g., parameter sets that correspond to the layers of the model). The base station 205 may transmit the backbone model and the task-specific model in the same message or different messages.

In a first example (Proposal 1), the base station 205 may transmit both the backbone mode and the task-specific model in control message 220-a, which may also be referred to as a configuration message. The control message 220-a may also include the configuration for the backbone model and the configuration for the task-specific model, where a configuration for a model includes information about building the model. The control message 220-a may also include additional task-specific models (and potentially the configurations for the additional task-specific models), which the UE 215 may store in memory. Storing multiple task-specific models from the control message 220-a may allow the UE 215 to update the task-specific model in use without additional signaling, which may reduce overhead.

In a second example (Proposal 2), the base station 205 may transmit the backbone mode in the control message 220-a and may transmit the task-specific model in the control message 220-b. The control message 220-a may also include the configuration for the backbone model and the control message 220-b may also include the configuration for the task-specific model. Additional task-specific models (and potentially configurations for the additional task-specific models) may be transmitted by the base station 205 using additional control messages. The additional task-specific models may be requested by the UE 215 or autonomously provided by the base station 205 (e.g., based on changing conditions at the UE 215). Dynamically providing task-specific models may conserve memory resources at the UE 215.

Although described separately, aspects of Proposal 1 and Proposal 2 may be combined or used jointly.

Figure 3:
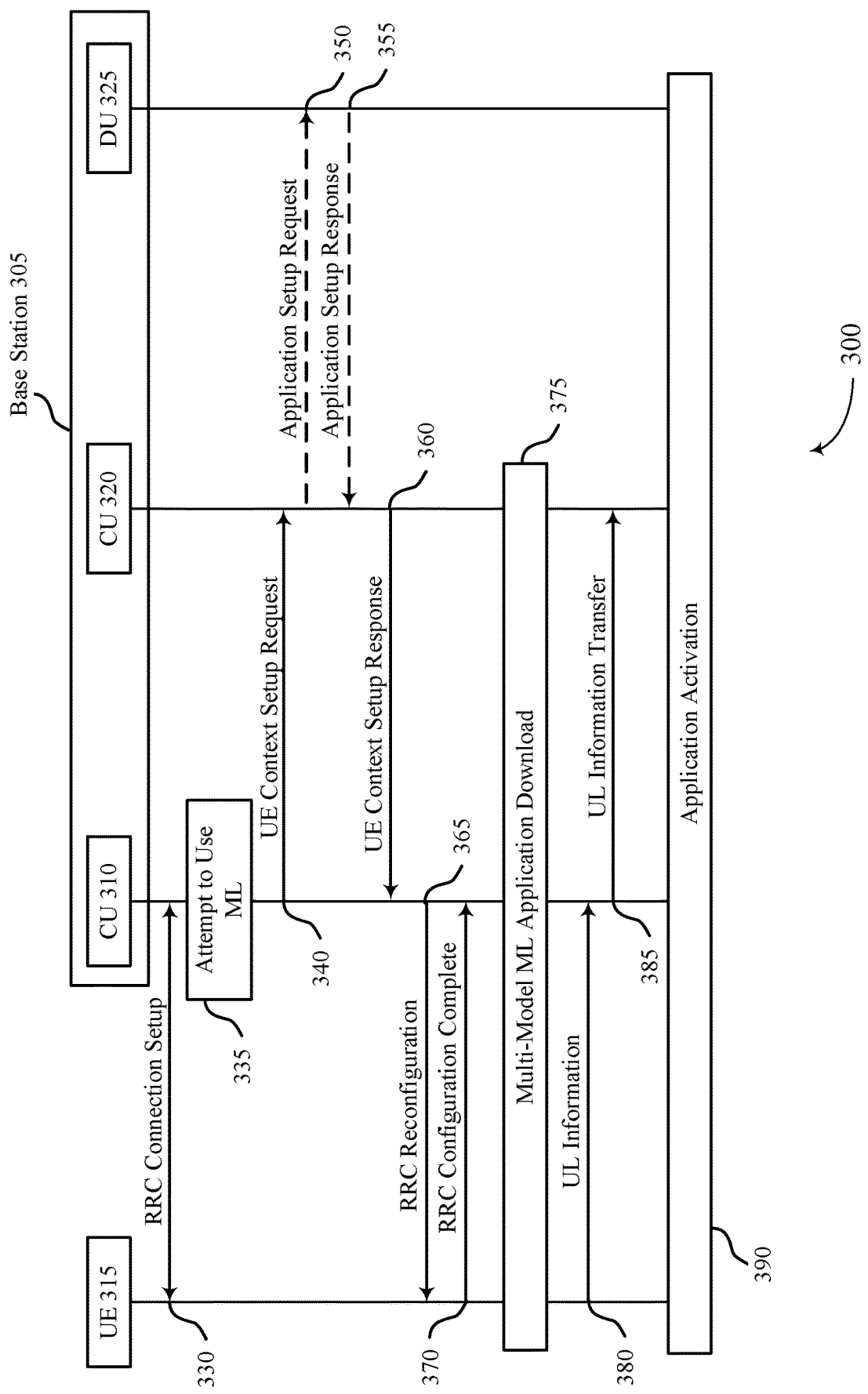
FIG. 3 illustrates an example of a process flow that supports configuring a multi-model machine learning application in accordance with aspects of the present disclosure.

FIG. 3 illustrates an example of a process flow 300 that supports configuring a multi-model machine learning application in accordance with aspects of the present disclosure. The process flow 300 may be implemented by a base station 305 and a UE 315, which may be examples of a base station and a UE as described herein. Base station 305 may include CU 310, CU 320 (which may also be referred to as CU-XP, an application manager, or a model manager), and DU 325. Process flow 300 may illustrate operations of the base station 305 and the UE 315 for configuring an application inference. The operations may enable the UE 315 to efficiently update machine learning applications.

At 330, the UE 315 and the base station 305 (e.g., via CU 310) may engage in an RRC connection setup procedure. During the RRC connection setup procedure, the UE 315 may report the radio capabilities and machine learning capabilities of the UE 315. At 335, CU 310 may attempt to use machine learning for one or more operations or functions. At 340, CU 310 may communicate a UE context setup request to CU 320. In some examples, the UE context setup request may indicate the machine learning capabilities of the UE 315. In some examples, the UE context setup request may indicate a list of requested neural network function identifiers, which may be referred to as NNF-IDs and which may identify the function achieved by a neural network. For example, a neural network may achieve a function: $Y=F(X)$, where F may be identified by a standardized Neural network identifier NNF-ID, X may refer to a standardized input to a neural network, and Y may refer to a standardized out of the neural network. At 345, CU 320 may communicate an application setup request to DU 325.

At 350, CU 320 may communicate an application setup request to DU 325. At 355, DU 325 may communicate an application setup response to CU 320. At 360, CU 320 may communicate a UE context setup response to CU 310. In some examples, the UE context setup response may indicate a list of accepted NNF-IDs. In some examples, the UE context setup response may indicate or include a machine learning container. At 365, base station 305 may (e.g., via CU 310) transmit an RRC reconfiguration message to UE 315. The RRC reconfiguration message may be an RRC message. In some examples, the RRC reconfiguration message may indicate the list of accepted NNF-IDs. In some examples, the RRC reconfiguration message may indicate or include the machine learning container. At 370, UE 315 may transmit an RRC configuration complete message to the base station 305 (e.g., to CU 310).

At 375, the UE 315 and the base station 305 (e.g., via CU 310 and CU 320) may engage in a machine learning application download operation. For example, the base station 305 may transmit a multi-model machine learning application and a configuration for the multi-model machine learning application to the UE 315 (e.g., a model structure and weight set). The multi-model machine learning application, the configuration, or both, may be conveyed in one or more RRC messages. In Proposal 1, the base station 305 may use a single RRC message to transmit a backbone model and multiple task-specific models. The RRC message may also be used to transmit the configurations for the backbone model and the task-specific model, where a configuration for a model comprises information about building the model. In Proposal 2, the base station 305 may use a first RRC message to transmit a backbone model and may use a second RRC message to transmit a task-specific model. The first RRC message may also be used to transmit the configuration for the backbone model and the second RRC message may also be used to transmit the configuration for the task-specific model.

The multi-model machine learning application downloaded at 375 may be configured for one task, mapped to a specific set of conditions, or both. For example, the multi-model machine learning model may have a cell-based configuration, meaning that there is one multi-model machine learning application per cell. As another example, the multi-model machine learning application may have an operation-based or task-based configuration, meaning that there is one multi-model machine learning application per operation or per task (where a task may be a sub-operation for an operation). As another example, the multi-model machine learning application may have a scenario-based configuration, meaning that there is one multi-model machine learning application per scenario (e.g., set of conditions). As another example, the multi-model machine learning application may have a time-based configuration, meaning that there is one multi-model machine learning application per time stamp.

At 380, the UE 315 may transmit machine learning uplink information to the base station 305 (e.g., to CU 310). In some examples, the message that conveys the machine learning uplink information may also indicate or include the machine learning container. Additionally or alternatively, the message at 380 may indicate that a particular NNF is ready. At 385, CU 310 may communicate a machine learning uplink transfer message to CU 320. In some examples, the machine learning uplink transfer message may indicate or include the machine learning container. At 390, the UE 315 and the base station 305 (e.g., via CU 310, CU 320, and DU 325) may engage in an activation procedure for the multi-model machine learning application downloaded at 375.

Thus, the UE 315 and the base station 305 may build a connection via the operations between 330 and 370 (inclusive), perform a machine learning application download at 375, and activate the machine learning application via the operations between 380 and 390 (inclusive). Application activation may refer to use or implementation of a machine learning application and may also be referred to as making or configuring a machine learning inference.

Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 4:
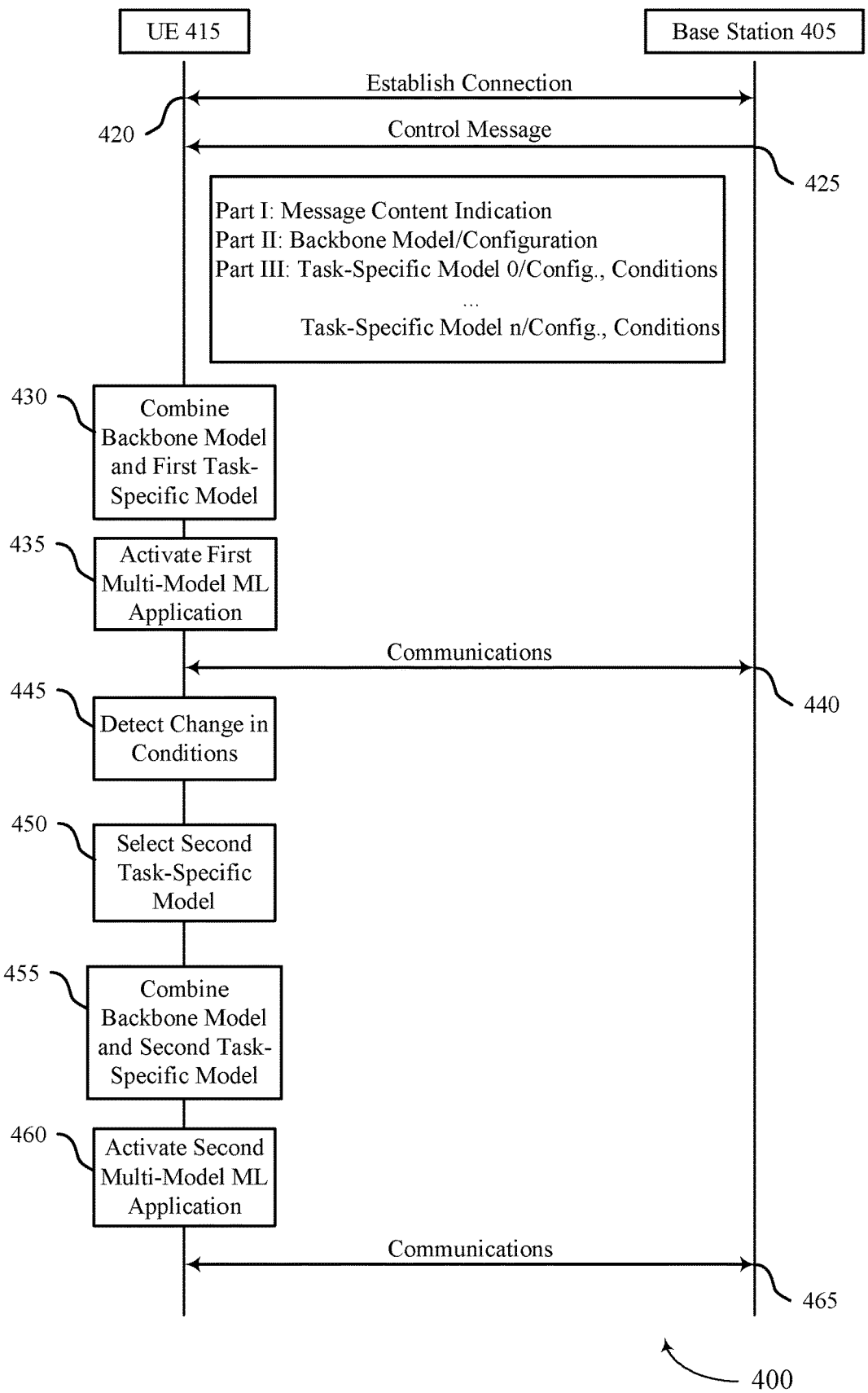
FIG. 4 illustrates an example of a process flow that supports configuring a multi-model machine learning application in accordance with aspects of the present disclosure.

FIG. 4 illustrates an example of a process flow 400 that supports configuring a multi-model machine learning application in accordance with aspects of the present disclosure. The process flow 400 may be implemented by a base station 405 and a UE 415, which may be examples of a base station and a UE as described herein. The process flow 400 may illustrate operations of the base station 405 and the UE 415 that enable the UE 415 to efficiently update machine learning applications using Proposal 1. In some examples, aspects of the process flow 400 may be combined with aspects of the process flow 300.

At 420, the UE 415 and the base station 405 may establish a connection. In some examples, the UE 415 and the base station 405 may establish the connection as described with reference to FIG. 3.

At 425, the base station 405 may transmit a control message to UE 415. The control message may be included in a MAC control element (MAC-CE), downlink control information (DCI), or in an RRC message, among other options. Referring to FIG. 3, the control message may be an example of an RRC message transmitted at 375. In some examples, the control message may include multiple parts. For example, the control message may include Part I, which may indicate the contents of the control message. For instance, Part I may include one or more bits that indicate whether the control message includes a single model (e.g., a backbone model) or multiple models. In some examples, Part I may identify a backbone model that is combinable with at least one task-specific model to generate at least one multi-model machine learning application.

In some examples, the control message may include Part II, which may include or indicate the backbone model. Part II may also include or indicate the configuration for the backbone model. In some examples, the backbone model may include a structure for the backbone model and one or more sets of parameters corresponding to the structure.

In some examples, the control message may include Part III, which may include or indicate one or more task-specific models, one or more configurations for one or more task-specific models, or both. For example, Part III may include the task-specific model 0 and the task-specific model n, among other task-specific models. Part III may also include the configurations for task-specific model 0 and task-specific model n. In some examples, Part III may also indicate the conditions corresponding to each task-specific model. For example, for a given task-specific model, Part III may indicate one or more conditions or scenarios for which the task-specific model is suitable (e.g., conditions or scenarios supported by or compatible with the task-specific model). For example, a task-specific model may be suitable for certain channel conditions (e.g., indoor channel conditions, outdoor channel conditions, highspeed channel conditions) but not others. In some examples, Part III may indicate one or more tasks supported by a task-specific model, or one or more operations supported by the task-specific model (where a task may be a sub-operation for an operation). For example, for a given task-specific model Part III may indicate an operation supported by the task-specific model (e.g., mobility management, beam management, CFS reporting), a task supported by the task-specific model (e.g., precoder determination, which may be used in one or more operations), or both. As such, the task-specific models and backbone model are configured in one download indicating that each of the configured specific models are combinable with the backbone model.

At 430, the UE 415 may combine the backbone mode with one of the task-specific models to build an end-to-end multi-model machine learning application. For example, the UE 415 may combine the backbone model with a first task-specific model. The UE 415 may select the first task-specific model based on the conditions at the UE 415, based on the conditions corresponding to the first task-specific model, or both. Additionally or alternatively, the UE 415 may combine the backbone model with the first task-specific model based on task, serving cell, or both, among other factors. The UE 415 may determine (e.g., infer) that the first task-specific model is compatible with the backbone model based on the first task-specific model being included in the same message as the backbone model. When combined with the backbone model, the first task-specific model may operate on one or more intermediate outputs from the backbone model.

At 435, the UE 415 may activate the first end-to-end multi-model machine learning application that includes the combination of the backbone model and the first task-specific model. For example, the UE 415 may use the first multi-model machine learning application to perform one or more operations.

At 440, the UE 415 may use the first multi-model machine learning application for communications with base station 405 (or another wireless device), among other operations. For example, the UE 415 may use the first multi-model machine learning application to process one or more signals received from the base station 405 to generate one or more outputs. Thus, the UE 415 may communicate a message with base station 405 (or another wireless device) based on one or more outputs from the first task-specific model (which in turn may be based on the one or more intermediate outputs from the backbone model). To illustrate, the UE 415 may select a beam direction for communicating with the base station 405 based on the one or more outputs (e.g., angle estimations) from the first task-specific model. As another example, the UE 415 may use a precoder for communicating with the base station 405 that is based on one or more precoder parameters output from the first task-specific model.

At 445, the UE 415 may detect a change in one or more conditions. For example, the UE 415 may determine that a channel condition has changed relative to a previous point in time. Additionally or alternatively, the UE 415 may detect a change in tasks, a change in serving cells, or both.

At 450, the UE 415 may select a second task-specific model for use with the backbone model. The UE 415 may select the second task-specific model based on the conditions at the UE 415, based on the conditions corresponding to the second task-specific model. Thus, the change in conditions may serve as a basis or trigger for updating the task-specific model in use by the UE 415. Additionally or alternatively, the UE 415 may select the second task-specific model based on task, serving cell, or both, among other factors. The UE 415 may select the second task-specific model from a set of task-specific models that were conveyed by the control message and that were stored in memory at the UE 415. By storing the set of task-specific models in memory, the UE 415 may avoid signaling with the base station 405 for the second task-specific model, which may reduce overhead signaling.

At 455, the UE 415 may combine the second-task specific model with the backbone model. In some examples, combining the second task-specific model with the backbone model may include replacing the first task-specific model with the second task-specific model. Collectively, the second-task specific model and the backbone model may form an end-to-end multi-model machine learning application. When combined with the backbone model, the second task-specific model may operate on one or more intermediate outputs from the backbone model.

At 460, the UE 415 may activate the second multi-model machine learning application that includes the combination of the backbone model and the second task-specific model. For example, the UE 415 may use the second multi-model machine learning application to perform one or more operations. At 465, the UE 415 may use the second multi-model machine learning application for communications with base station 405 (or another wireless device), among other operations. For example, the UE 415 may use the second multi-model machine learning application to process one or more signals received from the base station 405 to generate one or more outputs. In an example, the UE 415 may then use the second multi-model machine learning application to generate an estimated angle, generated precoder, or both for communication of a message with the base station 205. For example, the UE 415 may transmit the message in a beam direction corresponding to an angle output by the second multi-model machine learning application, the UE 415 may precode the message for transmission using a precoder output by the second multi-model machine learning application, or the like. Thus, the UE 415 may communicate a message with base station 405 (or another wireless device) based on one or more outputs from the second task-specific model (which in turn may be based on the one or more intermediate outputs from the backbone model).

Thus, the UE 415 may efficiently update a machine learning application using Proposal 1. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
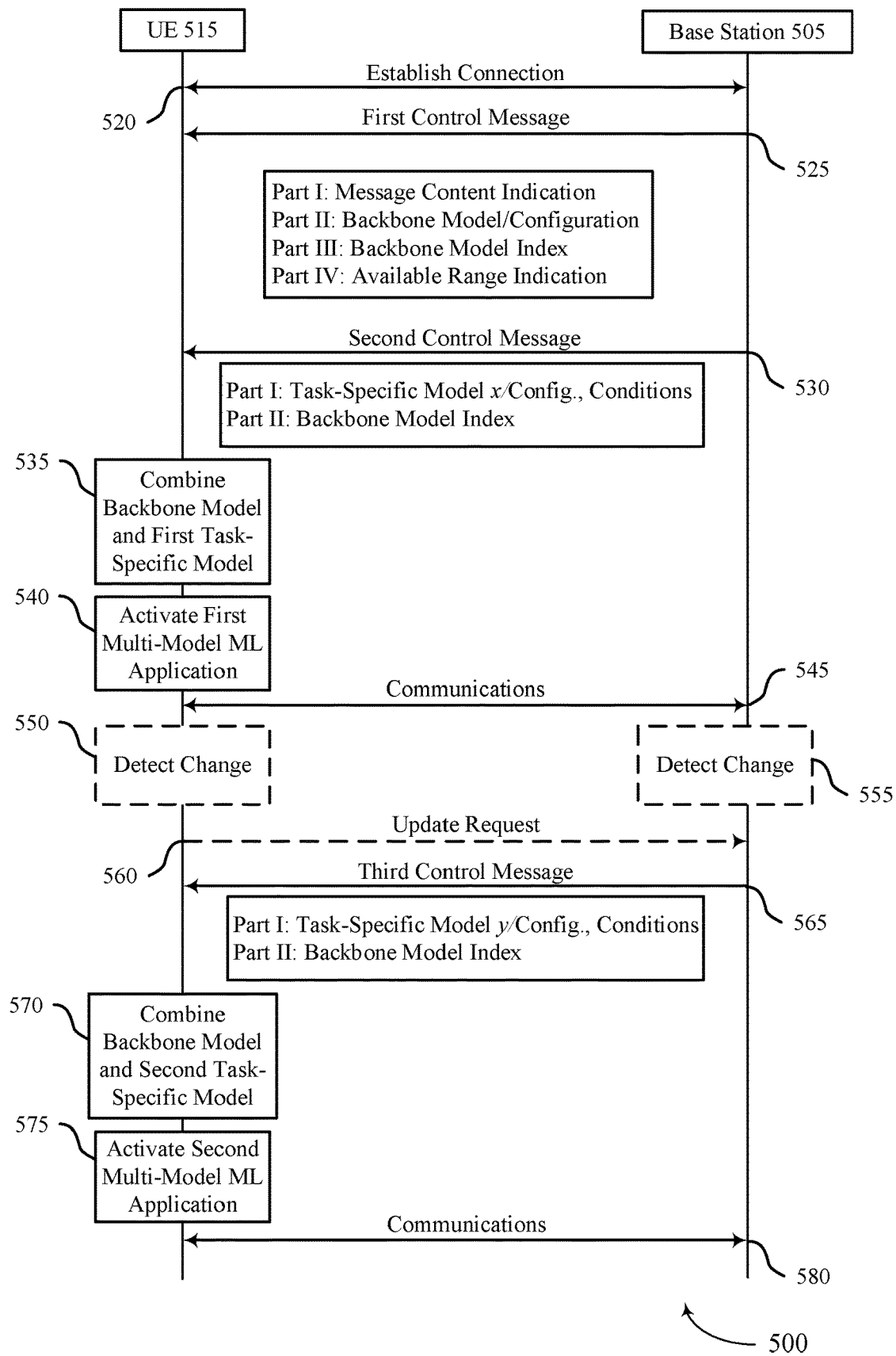
FIG. 5 illustrates an example of a process flow that supports configuring a multi-model machine learning application in accordance with aspects of the present disclosure.

FIG. 5 illustrates an example of a process flow 500 that supports configuring a multi-model machine learning application in accordance with aspects of the present disclosure. The process flow 500 may be implemented by a base station 505 and a UE 515, which may be examples of a base station and a UE as described herein. The process flow 500 may illustrate operations of the base station 505 and the UE 515 that enable the UE 515 to efficiently update machine learning applications using Proposal 2. In some examples, aspects of the process flow 500 may be combined with aspects of the process flow 300, the process flow 400, or both.

At 520, the UE 515 and the base station 505 may establish a connection. In some examples, the UE 515 and the base station 505 may establish the connection as described with reference to FIG. 3.

At 525, the base station 505 may transmit a first control message to UE 515. The first control message may be included in a MAC-CE, DCI, or in an RRC message, among other options. Referring to FIG. 3, the first control message may be an example of an RRC message transmitted at 375. In some examples, the first control message may include multiple parts. For example, the control message may include Part I, which may indicate the contents of the first control message. For instance, Part I may be one or more bits that indicate whether the first control message includes a single model (e.g., a backbone model) or multiple models. In some examples, Part I may identify a backbone model that is combinable with at least one task-specific model to generate at least one multi-model machine learning application.

In some examples, the first control message may include Part II, which may include or indicate the backbone model. Part II may also include or indicate the configuration for the backbone model. In some examples, the backbone model may include a structure for the backbone model and one or more sets of parameters corresponding to the structure. In some examples, the control message may include Part III, which may indicate an index for the backbone model. The index may differentiate the backbone model from other backbone models and may allow the UE 515 to determine the compatibility between backbone models and task-specific models.

In some examples, the control message may include Part IV, which may include an available range indication. The available range indication may include one or more indications of applications, operations, tasks, conditions, scenarios, or a combination of these, supported by the backbone model.

For example, the available range indication may indicate a list of applications supported by the backbone model (e.g., the backbone model may be a DarkNet backbone model that supports image applications, or the backbone model may be a channel-based model that supports channel decoding applications). Other examples of backbone models include DeNet, FishNet, VGGNet, AlexNet, and ResNet, one or more of which may support image recognition, and GPT and Bert, which may support voice applications.

Additionally or alternatively, the available range indication may indicate a list of operations supported by the backbone model (e.g., the backbone model may support beam management, mobility management, CSF reporting). Additionally or alternatively, the available range indication may indicate a list of tasks (e.g., wireless communication processing tasks) supported by the backbone model. Additionally or alternatively, the available range indication may indicate a list of conditions supported by the backbone model (e.g., outdoor conditions, indoor conditions, Doppler speed conditions, bandwidth conditions). For example, a backbone model may be used in certain bandwidth configuration (e.g., 5 MHz, 10 MHz, 20 MHZ, etc.) Additionally or alternatively, the available range indication may indicate a list of scenarios supported by the backbone model. Additionally or alternatively, the available range indication may indicate one or more cells that support the backbone mode (e.g., the available range indication may indicate the indices of cells that support the backbone model). Additionally or alternatively, the available range indication may indicate one or more ports that support the backbone model. Additionally or alternatively, the available range indication may indicate one or more periods of time during which the backbone model is supported (e.g., properly functions). In some examples, the periods of time during which the backbone model is supported may be indicated by one or more timers or timer values included in Part IV (e.g., for the next hour, within a defined time period, etc.).

At 530, the base station 505 may transmit a second control message to UE 515. The second control message may be included in a MAC-CE, DCI, or in an RRC message, among other options. Referring to FIG. 3, the second control message may be an example of an RRC message transmitted at 375 (e.g., as part of downloading a new model) or an RRC message transmitted at 390 (e.g., as part of signaling for a new model download procedure during a model activation procedure).

In some examples, the second control message may include multiple parts. For example, the second control message may include Part I, which may include or indicate a first task-specific model (e.g., task-specific model x), the configuration for the first task-specific model, or both. In some examples, the first task-specific model may include a structure for the first task-specific model and one or more sets of parameters corresponding to the structure. In some examples, Part I may also include or indicate the conditions, scenarios, or both corresponding to the first task-specific model. In some examples, Part I may also indicate the operations, tasks, or both supported by the first task-specific model. In some examples, Part I may also indicate one or more cells that support the first task-specific model.

In some examples, the second control message may include Part II, which may indicate the index of a backbone model with which the first task-specific model is compatible (e.g., Part II may indicate the index of the backbone model configured by the first control message). In some examples, the second control message may include an additional part that indicates the contents of the second control message.

At 535, the UE 515 may combine the backbone model with the first task-specific model to build an end-to-end multi-model machine learning application. The UE 515 may select the first task-specific model based on the conditions at the UE 515, based on the conditions corresponding to the first task-specific model, or both. Additionally or alternatively, the UE 515 may combine the backbone model with the first task-specific model based on task, serving cell, or both, among other factors. When combined with the backbone model, the first task-specific model may operate on one or more intermediate outputs from the backbone model.

At 540, the UE 515 may activate the first multi-model machine learning application that includes the combination of the backbone model and the first task-specific model. For example, the UE 515 may use the first multi-model machine learning application to perform one or more operations.

At 545, the UE 515 may use the first multi-model machine learning application for communications with base station 505 (or another wireless device), among other operations. For example, the UE 515 may use the first multi-model machine learning application to process one or more signals received from the base station 505 to generate one or more outputs. Thus, the UE 515 may communicate a message with base station 505 (or another wireless device) based on one or more outputs from the first task-specific model (which in turn may be based on the one or more intermediate outputs from the backbone model).

At 550, the UE 515 may detect a change in tasks, conditions, or scenarios at the UE 515. Additionally or alternatively, the base station 505 may, at 555, detect a change in tasks, conditions, or scenarios at the UE 515. In one example, the UE 515 may detect that the UE 515 has moved from an indoor scenario to an outdoor scenario.

At 560, the UE 515 may transmit a request for a second task-specific model. The request may include an indication of the second task-specific model, an indication of one or more conditions, tasks, scenarios, or a combination thereof. Continuing the foregoing example, upon transitioning from the indoor scenario to the outdoor scenario, the UE 515 may request a task-specific model that supports the outdoor scenario. The request may be included in an uplink control message (e.g., uplink control information (UCI)), in a MAC-CE, or in an RRC message, among other options. In some examples, the request may be one bit that indicates whether the current task-specific model is still suitable. In some examples, the request may indicate the corresponding backbone model index (e.g., the backbone model index in use by the UE 515).

At 565, the base station 505 may transmit a third control message to the UE 515. The base station 505 may transmit the third control message based on detecting the change at 555, based on the request from the UE 515, or both. The third control message may be included in a MAC-CE, DCI, or in an RRC message, among other options. Referring to FIG. 3, the third control message may be an example of an RRC message transmitted at 375 or an RRC message transmitted at 390. The base station 505 may transmit the third control message based on the request from the UE 515 or based on detecting the change in tasks, conditions, or scenarios at 555. For example, the base station 505 may detect that the UE 515 has switched from an outdoor cell to an indoor cell and may transmit the third control message to update the task-specific model based on the detection.

In some examples, the third control message may include multiple parts. For example, the third control message may include Part I, which may include or indicate the second task-specific model (e.g., task-specific model y), the configuration for the second task-specific model, or both. In some examples, the second task-specific model may include a structure for the second task-specific model and one or more sets of parameters corresponding to the structure. In some examples, Part I of the third control message may also include or indicate the conditions corresponding to the second task-specific model. In some examples, Part I of the third control message may indicate the operations or tasks supported by the second task-specific model. In some examples, Part I of the third control message may indicate one or more cells that support the second task-specific model.

In some examples, the third control message may include Part II, which may indicate the index of a backbone model with which the second task-specific model is compatible (e.g., Part II may indicate the index of the backbone model configured by the first control message). In some examples, the third control message may include an additional part that indicates the contents of the third control message.

At 570, the UE 515 may combine the backbone mode with the second task-specific model. In some examples, combining the second task-specific model with the backbone model may include replacing the first task-specific model with the second task-specific model. The UE 515 may select the second task-specific model based on the conditions at the UE 515, based on the conditions corresponding to the second task-specific model, or both. Additionally or alternatively, the UE 515 may select the second task-specific model based on task, serving cell, or both, among other factors. Collectively, the second-task specific model and the backbone model may form an end-to-end multi-model machine learning application. When combined with the backbone model, the second task-specific model may operate on one or more intermediate outputs from the backbone model.

At 575, the UE 515 may activate the second multi-model machine learning application that includes the combination of the backbone model and the second task-specific model. For example, the UE 515 may use the second multi-model machine learning application to perform one or more operations. At 580, the UE 515 may use the second multi-model machine learning application for communications with base station 505 (or another wireless device), among other operations. For example, the UE 515 may use the second multi-model machine learning application to process one or more signals received from the base station 505 to generate one or more outputs. Thus, the UE 515 may communicate a message with base station 505 (or another wireless device) based on one or more outputs from the second task-specific model (which in turn may be based on the one or more intermediate outputs from the backbone model).

In some examples, the UE 515 may update the backbone model similar to updating the task-specific model. For example, if the backbone model is unsuitable for a given operation or set of conditions, the UE 515 may be configured with a new backbone model (e.g., in response to a request by the UE 515 or independent of a request by the UE 515). To illustrate, consider an example in which the UE 515 uses a backbone model that is supported by cell 1, cell 2, and cell 3. If the UE 515 moves to cell 4 (e.g., when the UE 515 is in idle mode), the UE 515 may send a request for a backbone model update. The request may include one or more bits that indicate whether the current backbone model is supported. Additionally or alternatively, the request may indicate the new conditions or scenario at the UE 515 (e.g., service from cell 4), a particular backbone model, or both.

Thus, the UE 515 may efficiently update a machine learning application using Proposal 2. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 6:
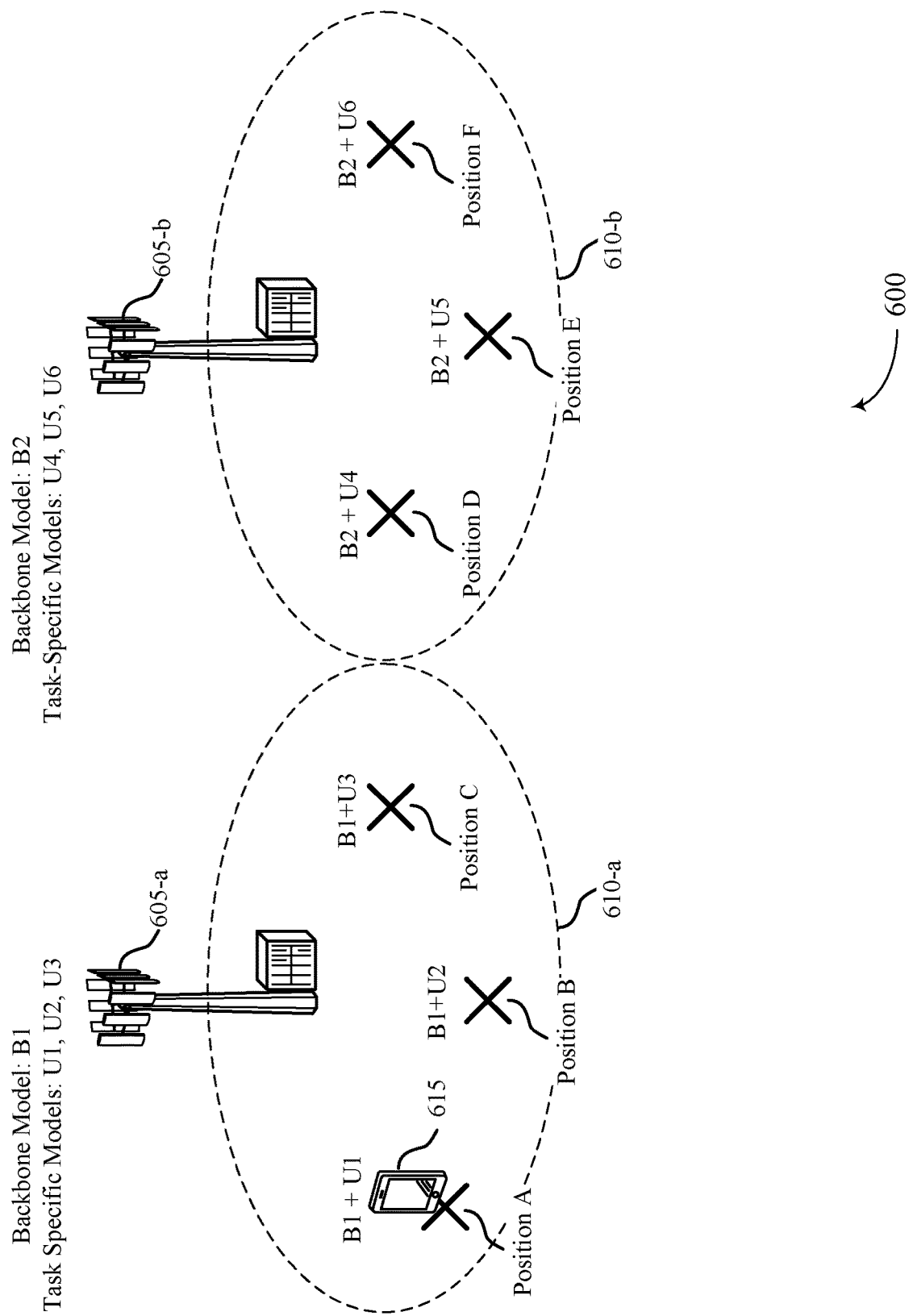
FIG. 6 illustrates an example of a wireless communications system that supports configuring a multi-model machine learning application in accordance with aspects of the present disclosure.

FIG. 6 illustrates an example of a wireless communications system 600 that supports configuring a multi-model machine learning application in accordance with aspects of the present disclosure. The wireless communications system 600 may include a base station 605-a, a base station 605-b, and a UE 615, which may be examples of corresponding devices as described herein. In the wireless communications system 600, the UE 615 may implement aspects of Proposal 2 to update backbone models and task-specific models that form multi-model machine learning applications.

Base station 605-a may be associated with a first cell or a first cell group that has coverage area 610-a. Base station 605-b may be associated with a second cell or a second cell group that has coverage area 610-b. Base station 605-a may support a first backbone model (denoted B1) and base station 605-b may support a second backbone model (denoted B2). The first backbone model may support a first set of channel conditions (e.g., Doppler conditions, channel type) and the second backbone mode may support a second set of channel conditions. For example, the first backbone model may support high Doppler conditions and the second backbone model may be configured for low Doppler conditions.

Upon accessing the cell (or the cell group) associated with base station 605-a, the UE 615 may receive a control message that includes, indicates, or configures (or a combination thereof) the first backbone model. The UE 615 may also receive another control message that includes, indicates, or configures (or a combination thereof) a first task-specific model (denoted U1) that is compatible with the first backbone model. The first task-specific model may be configured for use at Position A (e.g., the first task-specific model may be location-based). The UE 615 may combine the first task-specific model with the first backbone model to form a multi-model machine learning application, and may use the multi-model machine learning application for communications with base station 605-a.

If the UE 615 moves to Position B, the UE 615 may receive a control message that includes, indicates, or configures (or a combination thereof) a second task-specific model (denoted U2) that is compatible with the first backbone model and that is configured for use at Position B. Similarly, if the UE 615 moves to Position C, the UE 615 may receive a control message that includes, indicates, or configures (or a combination thereof) a third task-specific model (denoted U3) that is compatible with the first backbone model and that is configured for use at Position C. The control messages configuring task-specific models may be transmitted by base station 605-a in response to a request from the UE 615 or autonomously (e.g., independent of a request from the UE 615).

Upon accessing the cell (or the cell group) associated with base station 605-b, the UE 615 may receive a control message that includes, indicates, or configures the second backbone model. The UE 615 may also receive another control message that includes, indicates, or configures (or a combination thereof) a fourth task-specific model (denoted U4) that is compatible with the second backbone model. The fourth task-specific model may be configured for use at Position D. The UE 615 may combine the fourth task-specific model with the second backbone model to form a multi-model machine learning application, and may use the multi-model machine learning application to for communications with base station 605-b.

If the UE 615 moves to Position E, the UE 615 may receive a control message that includes, indicates, or configures (or a combination thereof) a fifth task-specific model (denoted U5) that is compatible with the second backbone model and that is configured for use at Position E. Similarly, if the UE 615 moves to Position F, the UE 615 may receive a control message that includes, indicates, or configures (or a combination thereof) a sixth task-specific model (denoted U6) that is compatible with the second backbone model and that is configured for use at Position D. The control messages configuring task-specific models may be transmitted by base station 605-*b* in response to a request from the UE 615 or autonomously (e.g., independent of a request from the UE 615).

Although describe with reference to a change in conditions (e.g., channel conditions, locations), the UE 615 may be configured with task-specific models based on other triggers, such as a change in tasks. Although describe with reference to a change in cells (or cell groups), the UE 615 may be configured with backbone models based on other triggers, such as a change in conditions.

Figure 7:
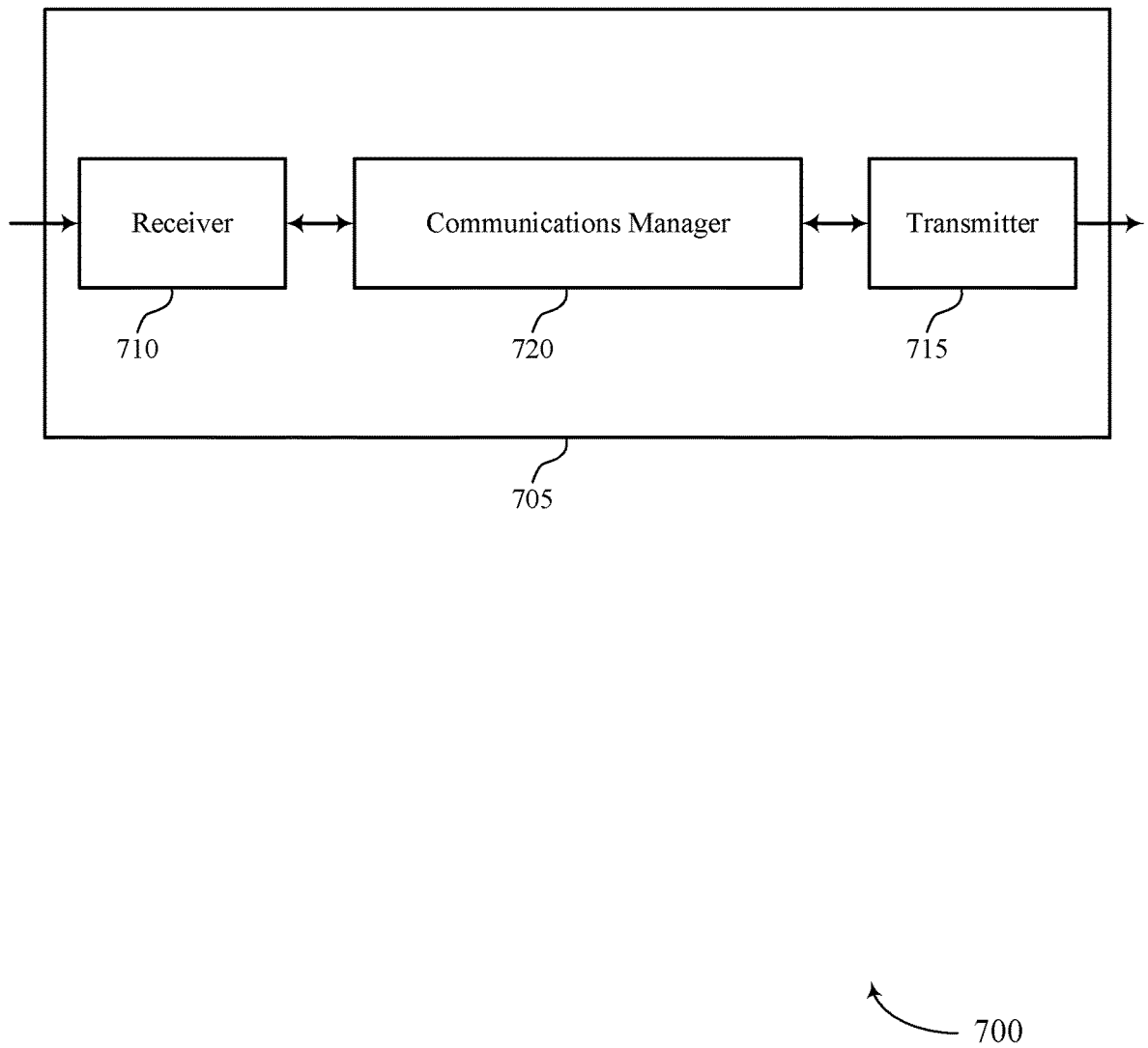
FIGS. 7 and 8 show block diagrams of devices that support configuring a multi-model machine learning application in accordance with aspects of the present disclosure.

FIG. 7 shows a block diagram 700 of a device 705 that supports configuring a multi-model machine learning application in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to configuring a multi-model machine learning application). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to configuring a multi-model machine learning application). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of configuring a multi-model machine learning application as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, a control message identifying a backbone model and at least one task-specific model, the backbone model being combinable with the at least one task-specific model to generate at least one multi-model machine learning application. The communications manager 720 may be configured as or otherwise support a means for receiving, from the base station, the backbone model and a first task-specific model of the at least one task-specific model identified by the control message. The communications manager 720 may be configured as or otherwise support a means for processing, by a first multi-model machine learning application that is a combination of the backbone model and the first task-specific model, one or more signals received from the base station to generate one or more outputs. The communications manager 720 may be configured as or otherwise support a means for communicating, with the base station or a wireless device, a first message based on the one or more outputs.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, and more efficient utilization of communication resources.

Figure 8:
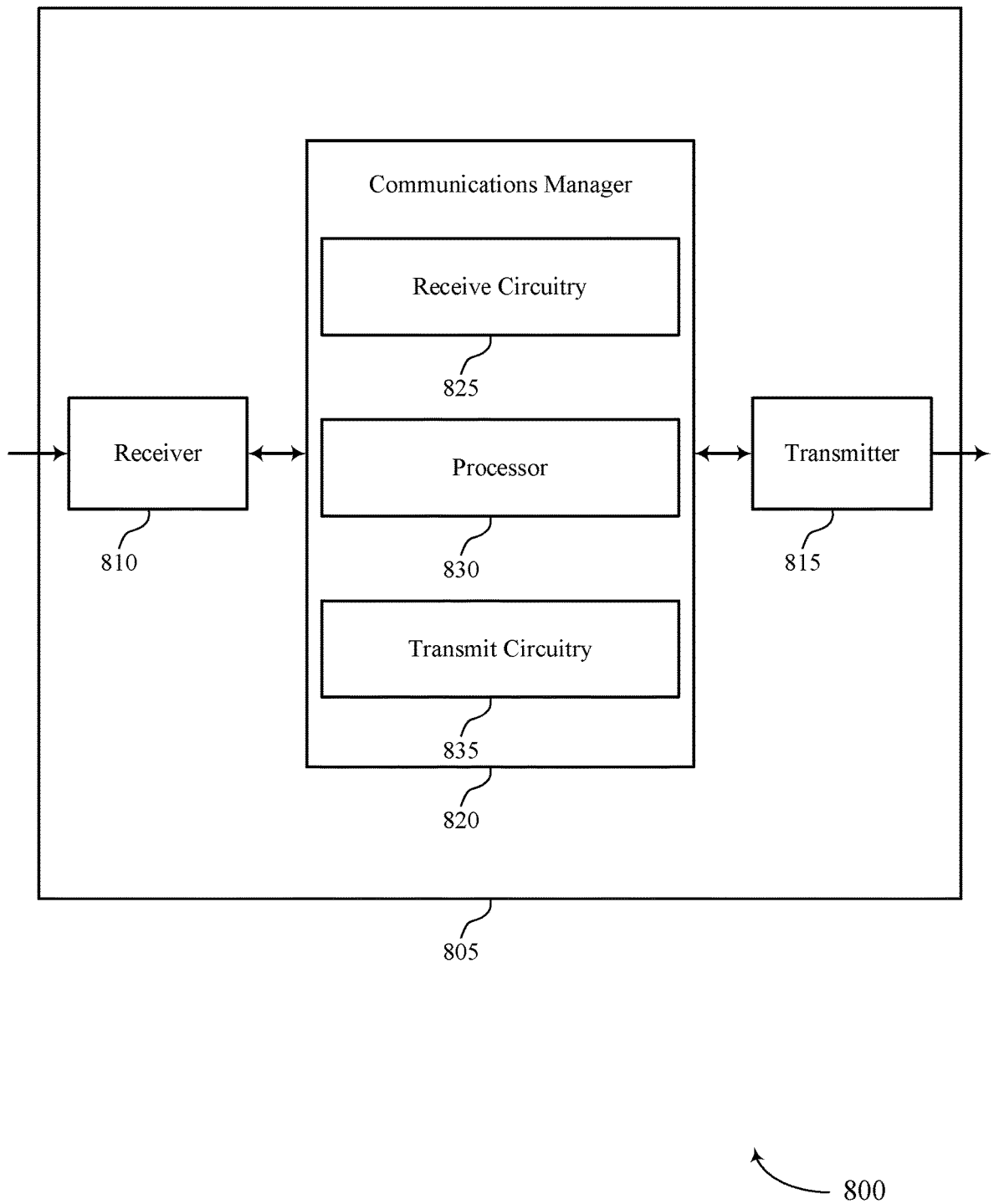

FIG. 8 shows a block diagram 800 of a device 805 that supports configuring a multi-model machine learning application in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to configuring a multi-model machine learning application). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to configuring a multi-model machine learning application). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of configuring a multi-model machine learning application as described herein. For example, the communications manager 820 may include a receive circuitry 825, a processor 830, a transmit circuitry 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The receive circuitry 825 may be configured as or otherwise support a means for receiving, from a base station, a control message identifying a backbone model and at least one task-specific model, the backbone model being combinable with the at least one task-specific model to generate at least one multi-model machine learning application. The receive circuitry 825 may be configured as or otherwise support a means for receiving, from the base station, the backbone model and a first task-specific model of the at least one task-specific model identified by the control message. The processor 830 may be configured as or otherwise support a means for processing, by a first multi-model machine learning application that is a combination of the backbone model and the first task-specific model, one or more signals received from the base station to generate one or more outputs. The transmit circuitry 835 may be configured as or otherwise support a means for communicating, with the base station or a wireless device, a first message based on the one or more outputs.

Figure 9:
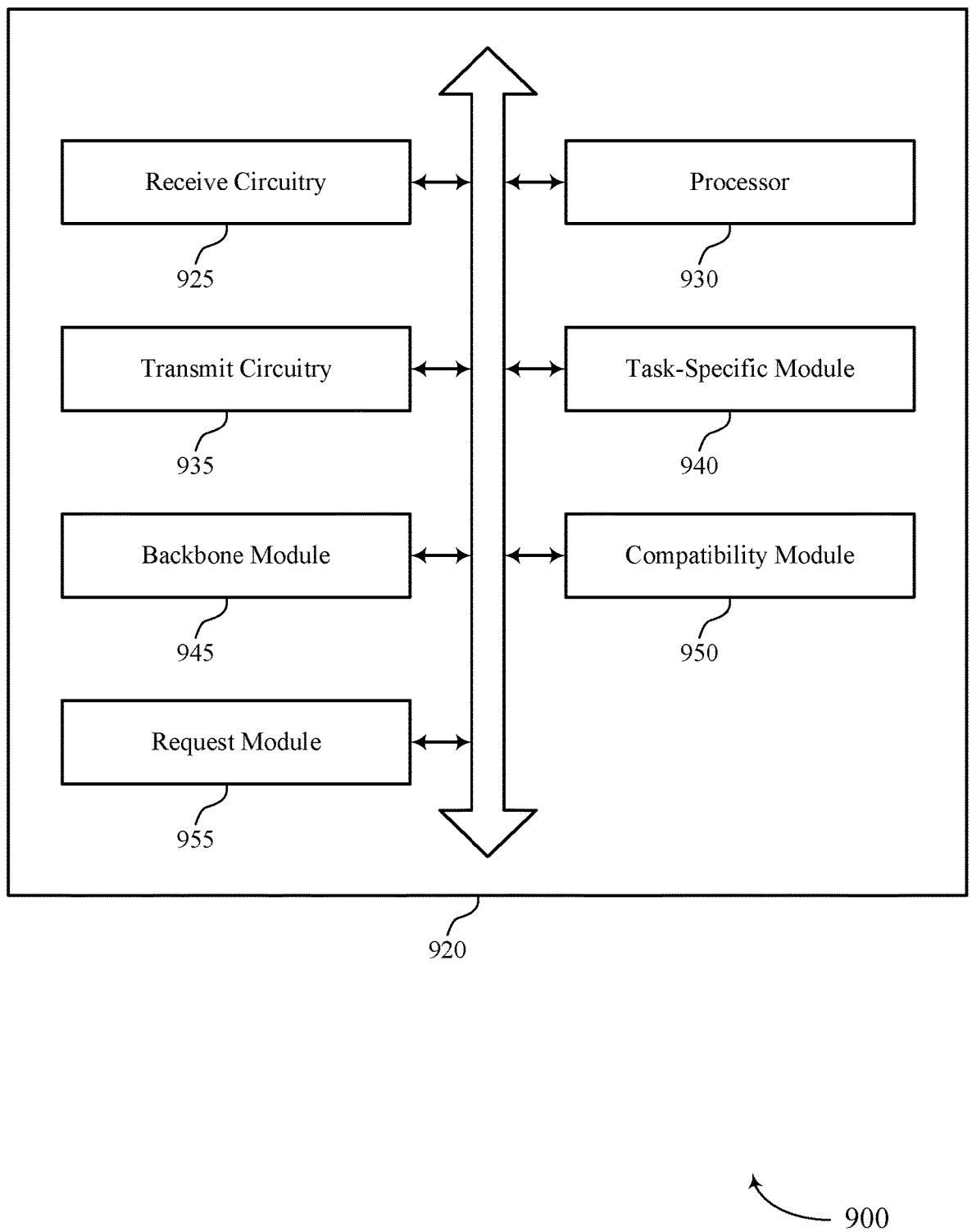
FIG. 9 shows a block diagram of a communications manager that supports configuring a multi-model machine learning application in accordance with aspects of the present disclosure.

FIG. 9 shows a block diagram 900 of a communications manager 920 that supports configuring a multi-model machine learning application in accordance with aspects of the present disclosure. The communications manager 920 may be an example of aspects of a communications manager 720, a communications manager 820, or both, as described herein. The communications manager 920, or various components thereof, may be an example of means for performing various aspects of configuring a multi-model machine learning application as described herein. For example, the communications manager 920 may include a receive circuitry 925, a processor 930, a transmit circuitry 935, a task-specific module 940, a backbone module 945, a compatibility module 950, a request module 955, or any combination thereof. Each of these components may communicate, directly or indirectly, with one another (e.g., via one or more buses).

The communications manager 920 may support wireless communication at a UE in accordance with examples as disclosed herein. The receive circuitry 925 may be configured as or otherwise support a means for receiving, from a base station, a control message identifying a backbone model and at least one task-specific model, the backbone model being combinable with the at least one task-specific model to generate at least one multi-model machine learning application. In some examples, the receive circuitry 925 may be configured as or otherwise support a means for receiving, from the base station, the backbone model and a first task-specific model of the at least one task-specific model identified by the control message. The processor 930 may be configured as or otherwise support a means for processing, by a first multi-model machine learning application that is a combination of the backbone model and the first task-specific model, one or more signals received from the base station to generate one or more outputs. The transmit circuitry 935 may be configured as or otherwise support a means for communicating, with the base station or a wireless device, a first message based on the one or more outputs.

In some examples, to support receiving the control message, the receive circuitry 925 may be configured as or otherwise support a means for receiving the control message identifying a backbone model configuration indicating a set of multiple scenarios, conditions, or tasks in which to apply the backbone model and a task-specific configuration for the first task-specific model indicating a first scenario, condition, or task of the set of multiple scenarios, conditions, or tasks in which to combine the first task-specific model with the backbone model to generate the first multi-model machine learning application.

In some examples, the task-specific module 940 may be configured as or otherwise support a means for receiving, in the control message, at least one indication of a set of multiple task-specific models and one or more scenarios, conditions, or tasks for combining a respective task-specific model with the backbone model. In some examples, the task-specific module 940 may be configured as or otherwise support a means for receiving the set of multiple task-specific models from the base station identified in the control message. In some examples, the transmit circuitry 935 may be configured as or otherwise support a means for communicating the first message based on a detected scenario, condition, or task indicating to combine the first task-specific model with the backbone model to generate the first multi-model machine learning application.

In some examples, the task-specific module 940 may be configured as or otherwise support a means for receiving an update control message identifying a second task-specific model that is combinable with the backbone model for generating a second multi-model machine learning application. In some examples, the task-specific module 940 may be configured as or otherwise support a means for receiving, from the base station, the second task-specific model identified in the update control message. In some examples, the processor 930 may be configured as or otherwise support a means for processing, by the second multi-model machine learning application that is a combination of the backbone model and the second task-specific model, one or more second signals received from the base station to generate one or more second outputs. In some examples, the transmit circuitry 935 may be configured as or otherwise support a means for communicating a second message based on one or more second outputs.

In some examples, the backbone module 945 may be configured as or otherwise support a means for receiving a second backbone model from the base station or a second base station and an indication that the second backbone model is combinable with a second task-specific model. In some examples, the processor 930 may be configured as or otherwise support a means for processing, by a second multi-model machine learning application that is a combination of the second backbone model and the second task-specific model, one or more second signals received from the base station or the second base station to generate one or more second outputs. In some examples, the transmit circuitry 935 may be configured as or otherwise support a means for communicating a second message based on one or more second outputs.

In some examples, the request module 955 may be configured as or otherwise support a means for transmitting a request for the second backbone model based on detecting a change in one or more conditions, one or more tasks, one or more scenarios, or any combination thereof. In some examples, the task-specific module 940 may be configured as or otherwise support a means for receiving the second task-specific model from the base station or the second base station. In some examples, the request module 955 may be configured as or otherwise support a means for transmitting a request for the second task-specific model based on detecting a change in one or more conditions, one or more tasks, one or more scenarios, or any combination thereof.

In some examples, to support receiving the control message, the backbone module 945 may be configured as or otherwise support a means for receiving a first control message including a backbone model configuration for the backbone model. In some examples, to support receiving the control message, the receive circuitry 925 may be configured as or otherwise support a means for receiving a second control message including a task-specific configuration for the first task-specific model, where the one or more signals are processed by the first multi-model machine learning application in accordance with the backbone model configuration and the task-specific configuration.

In some examples, the control message includes an index for the backbone model, and the compatibility module 950 may be configured as or otherwise support a means for determining that the first task-specific model is compatible with the backbone model based on the index for the backbone model. In some examples, the control message indicates a task list supported by the backbone model, and the processor 930 may be configured as or otherwise support a means for processing, by the first multi-model machine learning application, one or more second signals received from the base station to generate one or more second outputs corresponding to a task from the supported task list. In some examples, the task list indicates at least one mobility task, at least one beam management task, or any combination thereof.

In some examples, the control message indicates a scenario list supported by the backbone model, and the processor 930 may be configured as or otherwise support a means for processing, by the first multi-model machine learning application, one or more second signals received from the base station to generate one or more second outputs corresponding to a scenario from the supported scenario list. In some examples, the scenario list indicates at least one cell index, at least one doppler range index, at least one speed index, at least one bandwidth index (e.g., 5 MHz, 10 MHz, 20 MHz, etc.), at least one port index, or any combination thereof.

In some examples, the request module 955 may be configured as or otherwise support a means for transmitting a backbone model update request to the base station or a second base station based on detecting a scenario, a condition, or a task that is unsupported by the backbone model. In some examples, the receive circuitry 925 may be configured as or otherwise support a means for receiving a second backbone model and a second task-specific model based on the backbone model update request. In some examples, the processor 930 may be configured as or otherwise support a means for processing, by a second multi-model machine learning application that is a combination of the second backbone model and the second task-specific model, one or more second signals received from the base station or the second base station to generate one or more second outputs. In some examples, the transmit circuitry 935 may be configured as or otherwise support a means for communicating a second message based on one or more second outputs.

In some examples, to support receiving the control message, the receive circuitry 925 may be configured as or otherwise support a means for receiving the control message indicating a set of one or more application types supported by the backbone model, a set of one or more tasks supported by the backbone model, a set of one or more conditions for using the backbone model, one or more time periods for using the backbone model, or a combination thereof.

In some examples, to support processing the one or more signals, the processor 930 may be configured as or otherwise support a means for processing, using the backbone model, a reference signal or an estimated channel to generate one or more intermediate outputs. In some examples, to support processing the one or more signals, the processor 930 may be configured as or otherwise support a means for processing, using the first task-specific model, the one or more intermediate outputs to generate the one or more outputs.

In some examples, to support receiving the backbone model and the first task-specific model, the receive circuitry 925 may be configured as or otherwise support a means for receiving an indication of a first structure for the backbone model and a first set of one or more parameters corresponding to the first structure and an indication of a second structure for the first task-specific model and a second set of one or more parameters corresponding to the second structure. In some examples, the receive circuitry 925 may be configured as or otherwise support a means for receiving control signaling activating the backbone model and the first task-specific model.

Figure 10:
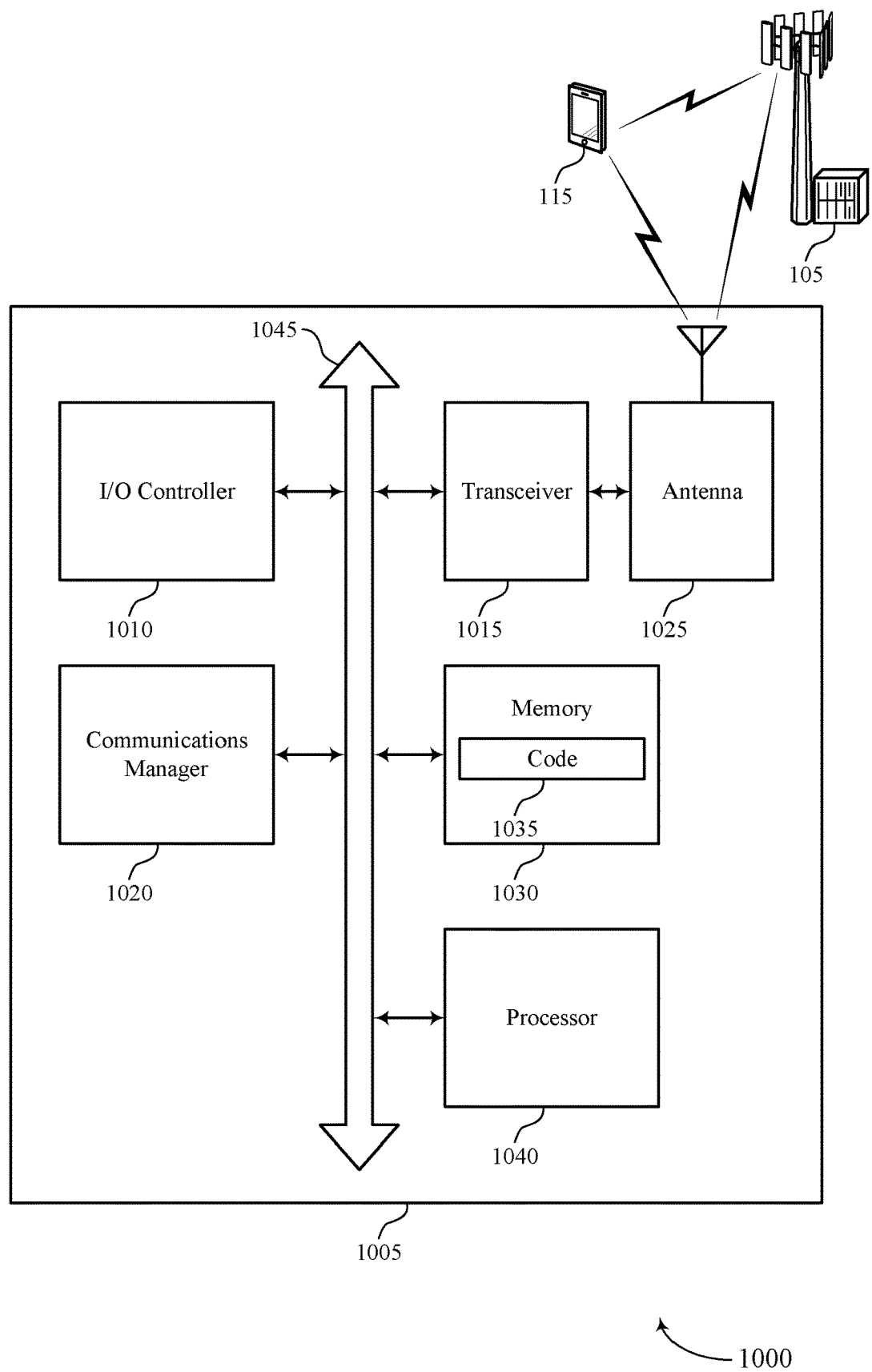
FIG. 10 shows a diagram of a system including a device that supports configuring a multi-model machine learning application in accordance with aspects of the present disclosure.

FIG. 10 shows a diagram of a system 1000 including a device 1005 that supports configuring a multi-model machine learning application in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting configuring a multi-model machine learning application). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, a control message identifying a backbone model and at least one task-specific model, the backbone model being combinable with the at least one task-specific model to generate at least one multi-model machine learning application. The communications manager 1020 may be configured as or otherwise support a means for receiving, from the base station, the backbone model and a first task-specific model of the at least one task-specific model identified by the control message. The communications manager 1020 may be configured as or otherwise support a means for processing, by a first multi-model machine learning application that is a combination of the backbone model and the first task-specific model, one or more signals received from the base station to generate one or more outputs. The communications manager 1020 may be configured as or otherwise support a means for communicating, with the base station or a wireless device, a first message based on the one or more outputs.

By including or configuring the communications manager 1020 in accordance with examples as described herein, the device 1005 may support techniques for reduced processing, reduced power consumption, and more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of configuring a multi-model machine learning application as described herein, or the processor 1040 and the memory 1030 may be otherwise configured to perform or support such operations.

Figure 11:
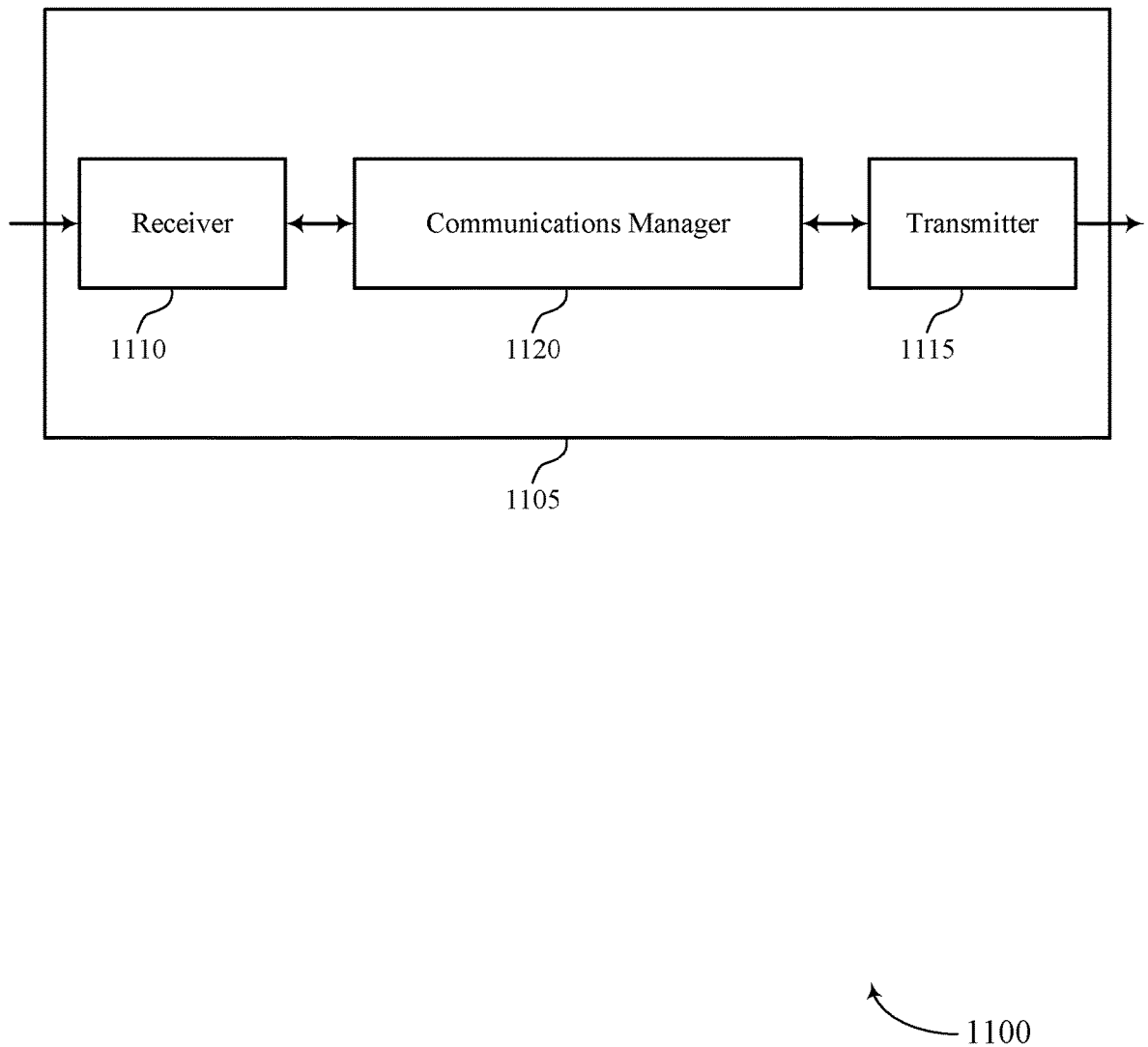
FIGS. 11 and 12 show block diagrams of devices that support configuring a multi-model machine learning application in accordance with aspects of the present disclosure.

FIG. 11 shows a block diagram 1100 of a device 1105 that supports configuring a multi-model machine learning application in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to configuring a multi-model machine learning application). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to configuring a multi-model machine learning application). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of configuring a multi-model machine learning application as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, a control message identifying a backbone model and at least one task-specific model, the backbone model being combinable with at the least one task-specific model to generate at least one multi-model machine learning application. The communications manager 1120 may be configured as or otherwise support a means for transmitting, to the UE, the backbone model and a first task-specific model of the at least one task-specific model identified by the control message, and an instruction to combine to the backbone model and the first task-specific model to generate a first multi-model machine learning application. The communications manager 1120 may be configured as or otherwise support a means for communicating, with the UE, a first message based on the first multi-model machine learning application.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, and more efficient utilization of communication resources.

Figure 12:
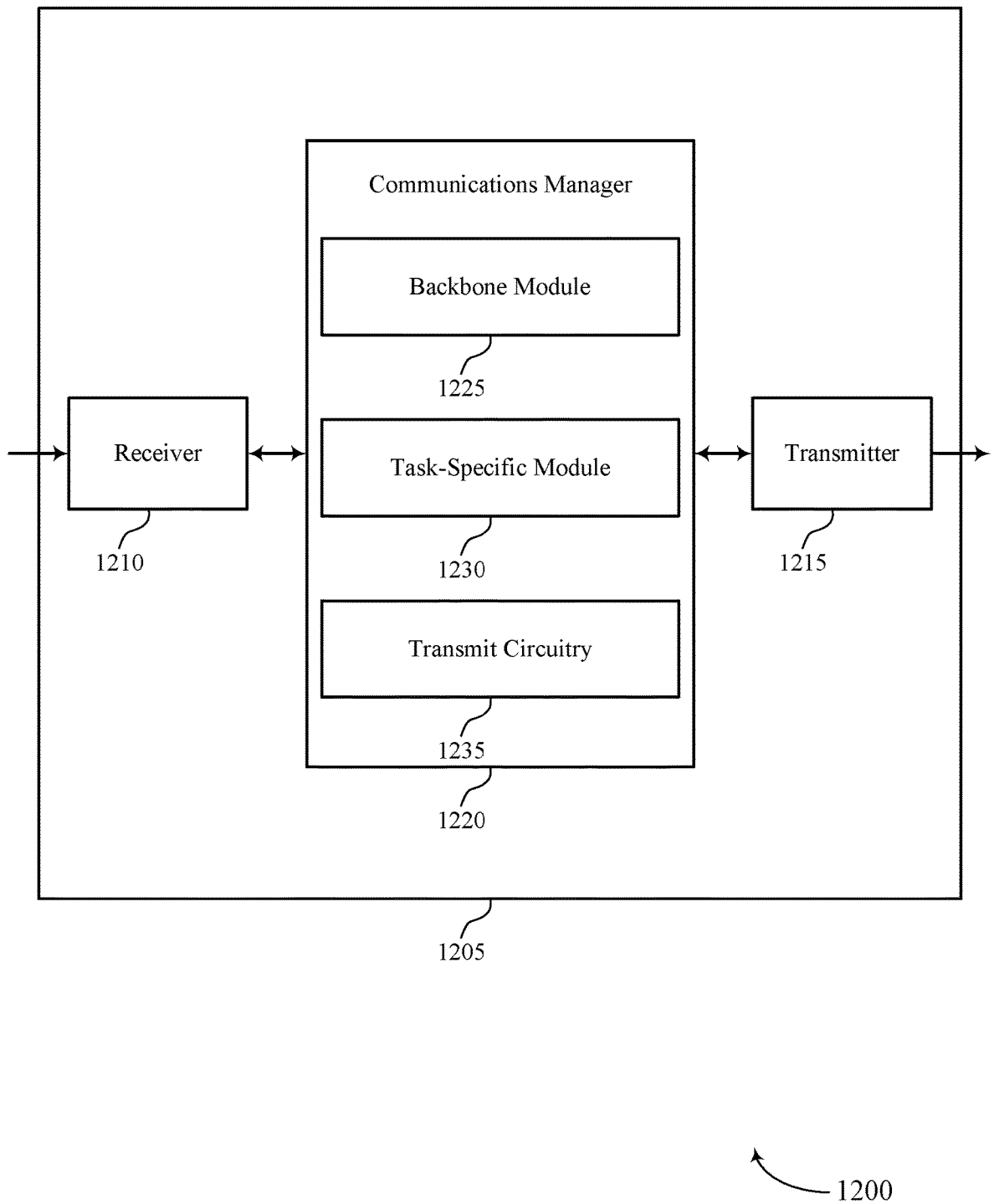

FIG. 12 shows a block diagram 1200 of a device 1205 that supports configuring a multi-model machine learning application in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to configuring a multi-model machine learning application). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to configuring a multi-model machine learning application). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of configuring a multi-model machine learning application as described herein. For example, the communications manager 1220 may include a backbone module 1225, a task-specific module 1230, a transmit circuitry 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The backbone module 1225 may be configured as or otherwise support a means for transmitting, to a UE, a control message identifying a backbone model and at least one task-specific model, the backbone model being combinable with the at least one task-specific model to generate at least one multi-model machine learning application. The task-specific module 1230 may be configured as or otherwise support a means for transmitting, to the UE, the backbone model and a first task-specific model of the at least one task-specific model identified by the control message, and an instruction to combine to the backbone model and the first task-specific model to generate a first multi-model machine learning application. The transmit circuitry 1235 may be configured as or otherwise support a means for communicating, with the UE, a first message based on the first multi-model machine learning application.

Figure 13:
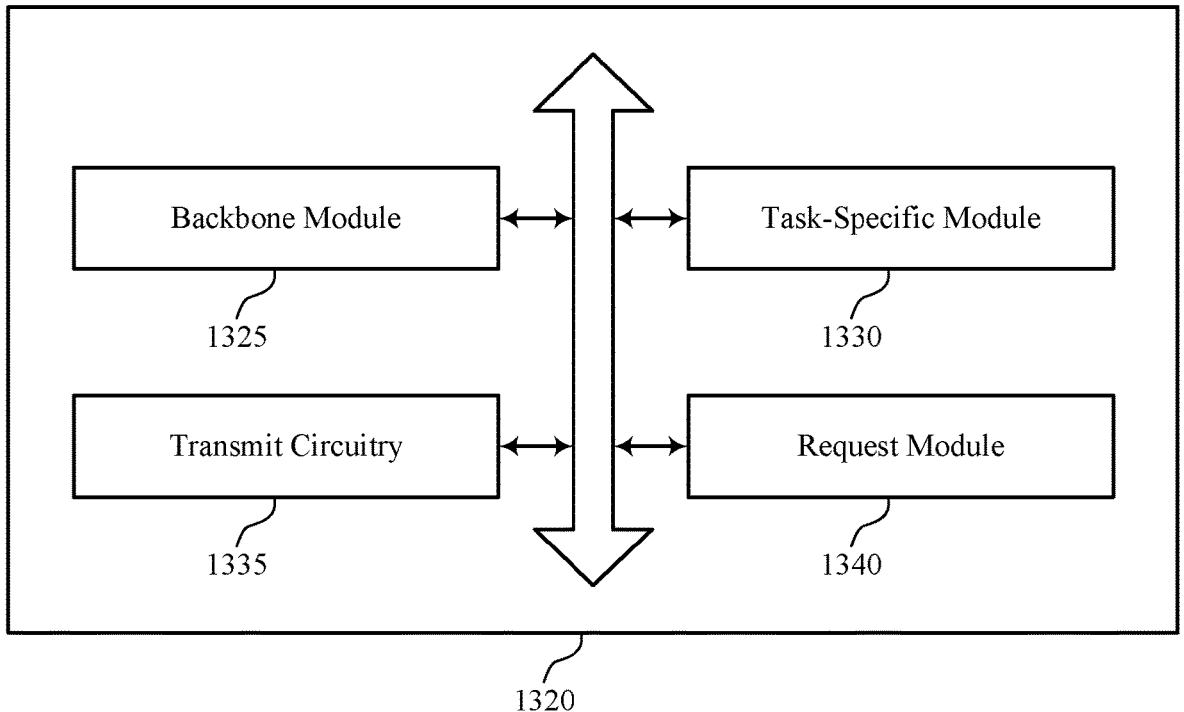
FIG. 13 shows a block diagram of a communications manager that supports configuring a multi-model machine learning application in accordance with aspects of the present disclosure.

FIG. 13 shows a block diagram 1300 of a communications manager 1320 that supports configuring a multi-model machine learning application in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of configuring a multi-model machine learning application as described herein. For example, the communications manager 1320 may include a backbone module 1325, a task-specific module 1330, a transmit circuitry 1335, a request module 1340, or any combination thereof. Each of these components may communicate, directly or indirectly, with one another (e.g., via one or more buses).

The communications manager 1320 may support wireless communication at a base station in accordance with examples as disclosed herein. The backbone module 1325 may be configured as or otherwise support a means for transmitting, to a UE, a control message identifying a backbone model and at least one task-specific model, the backbone model being combinable with the at least one task-specific model to generate at least one multi-model machine learning application. The task-specific module 1330 may be configured as or otherwise support a means for transmitting, to the UE, the backbone model and a first task-specific model of the at least one task-specific model identified by the control message, and an instruction to combine to the backbone model and the first task-specific model to generate a first multi-model machine learning application. The transmit circuitry 1335 may be configured as or otherwise support a means for communicating, with the UE, a first message based on the first multi-model machine learning application.

In some examples, to support transmitting the control message, the transmit circuitry 1335 may be configured as or otherwise support a means for transmitting the control message identifying a backbone model configuration indicating a set of multiple scenarios or tasks in which to apply the backbone model and a task-specific configuration for the first task-specific model indicating a first scenario or task of the set of multiple scenarios or tasks in which to combine the first task-specific model with the backbone model to generate the first multi-model machine learning application.

In some examples, the transmit circuitry 1335 may be configured as or otherwise support a means for transmitting an update control message identifying a second task-specific model that is combinable with the backbone model for generating a second multi-model machine learning application. In some examples, the task-specific module 1330 may be configured as or otherwise support a means for transmitting, to the UE, the second task-specific model identified in the update control message.

In some examples, the task-specific module 1330 may be configured as or otherwise support a means for transmitting, in the control message, at least one indication of a set of multiple task-specific models and one or more conditions for combining a respective task-specific model with the backbone model. In some examples, the task-specific module 1330 may be configured as or otherwise support a means for transmitting the set of multiple task-specific models from the base station identified in the control message. In some examples, the transmit circuitry 1335 may be configured as or otherwise support a means for communicating the first message based on a detected condition indicating to combine the first task-specific model with the backbone model to generate the first multi-model machine learning application.

In some examples, the backbone module 1325 may be configured as or otherwise support a means for transmitting a second backbone model to the UE and an indication that the second backbone model is combinable with a second task-specific model.

In some examples, to support transmitting the control message, the transmit circuitry 1335 may be configured as or otherwise support a means for transmitting a first control message including a backbone model configuration for the backbone model. In some examples, to support transmitting the control message, the transmit circuitry 1335 may be configured as or otherwise support a means for transmitting a second control message including a task-specific configuration for the first task-specific model.

In some examples, the request module 1340 may be configured as or otherwise support a means for receiving a backbone model update request based on detection of a scenario, a condition, or a task that is unsupported by the backbone model. In some examples, the transmit circuitry 1335 may be configured as or otherwise support a means for transmitting a second backbone model and a second task-specific model based on the backbone model update request.

In some examples, to support transmitting the control message, the transmit circuitry 1335 may be configured as or otherwise support a means for transmitting the control message indicating a set of one or more application types supported by the backbone model, a set of one or more tasks supported by the backbone model, a set of one or more conditions for using the backbone model, one or more time periods for using the backbone model, or a combination thereof.

In some examples, to support transmitting the backbone model and the first task-specific model, the transmit circuitry 1335 may be configured as or otherwise support a means for transmitting an indication of a first structure for the backbone model and a first set of one or more parameters corresponding to the first structure and an indication of a second structure for the first task-specific model and a second set of one or more parameters corresponding to the second structure.

Figure 14:
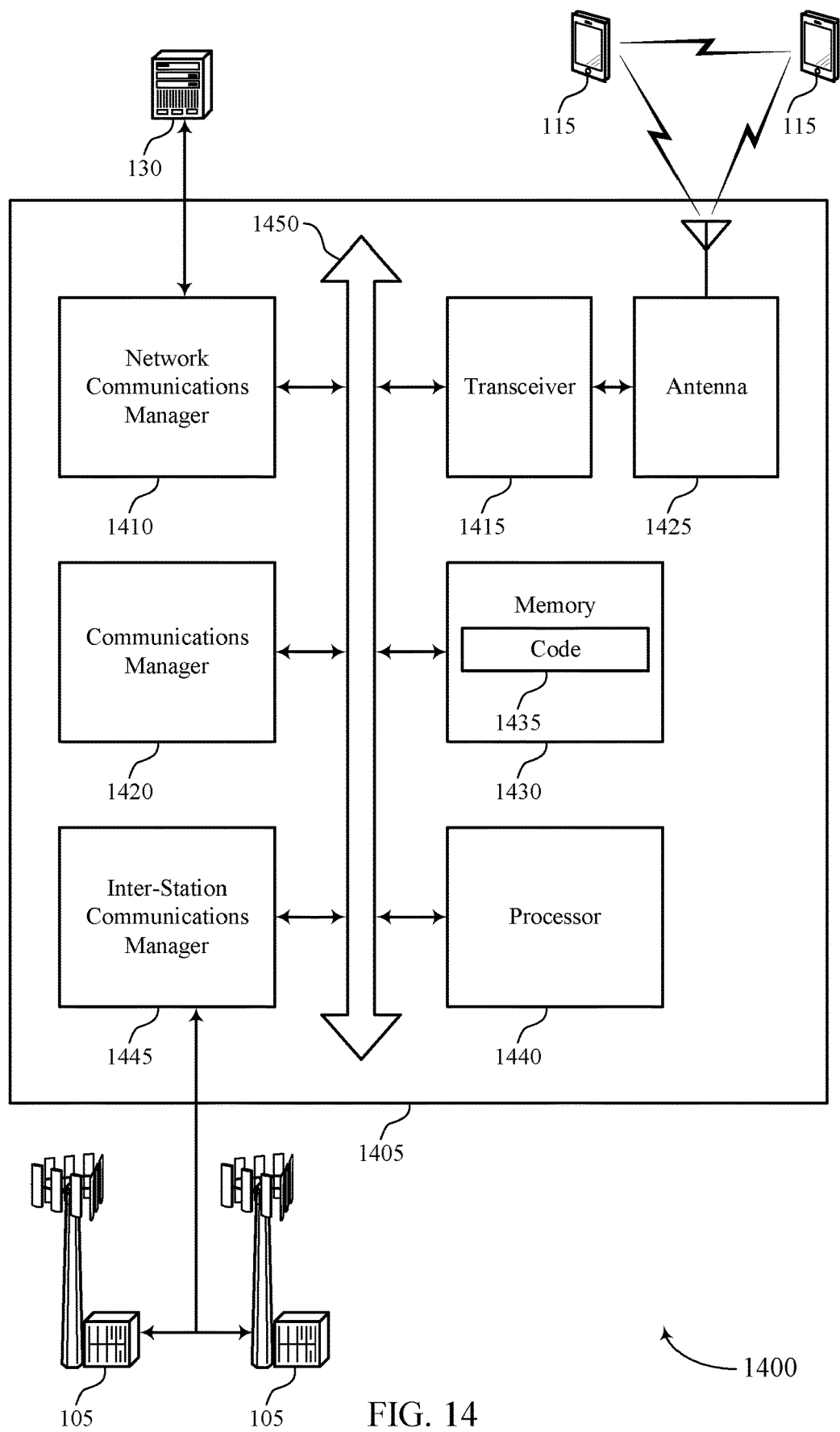
FIG. 14 shows a diagram of a system including a device that supports configuring a multi-model machine learning application in accordance with aspects of the present disclosure.

FIG. 14 shows a diagram of a system 1400 including a device 1405 that supports configuring a multi-model machine learning application in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting configuring a multi-model machine learning application). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, a control message identifying a backbone model and at least one task-specific model, the backbone model being combinable with the at least one task-specific model to generate at least one multi-model machine learning application. The communications manager 1420 may be configured as or otherwise support a means for transmitting, to the UE, the backbone model and a first task-specific model of the at least one task-specific model identified by the control message, and an instruction to combine to the backbone model and the first task-specific model to generate a first multi-model machine learning application. The communications manager 1420 may be configured as or otherwise support a means for communicating, with the UE, a first message based on the first multi-model machine learning application.

By including or configuring the communications manager 1420 in accordance with examples as described herein, the device 1405 may support techniques for reduced processing, reduced power consumption, and more efficient utilization of communication resources.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of configuring a multi-model machine learning application as described herein, or the processor 1440 and the memory 1430 may be otherwise configured to perform or support such operations.

Figure 15:
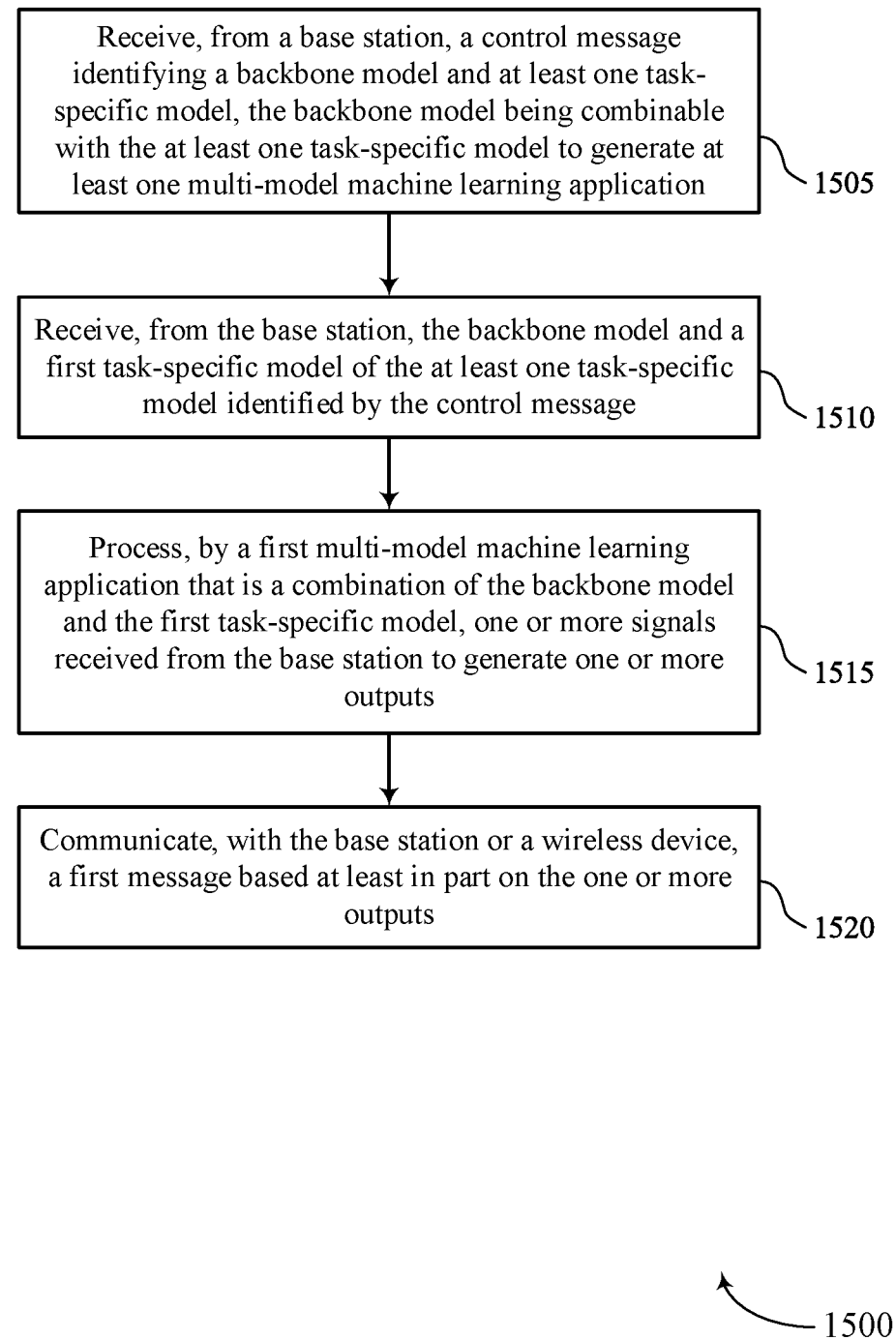
FIGS. 15 and 16 show flowcharts illustrating methods that support configuring a multi-model machine learning application in accordance with aspects of the present disclosure.

FIG. 15 shows a flowchart illustrating a method 1500 that supports configuring a multi-model machine learning application in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a control message identifying a backbone model and at least one task-specific model, the backbone model being combinable with the at least one task-specific model to generate at least one multi-model machine learning application. The operations of 1505 may be performed in accordance with examples as disclosed herein. In some examples, aspects of the operations of 1505 may be performed by a receive circuitry 925 as described with reference to FIG. 9.

At 1510, the method may include receiving, from the base station, the backbone model and a first task-specific model of the at least one task-specific model identified by the control message. The operations of 1510 may be performed in accordance with examples as disclosed herein. In some examples, aspects of the operations of 1510 may be performed by a receive circuitry 925 as described with reference to FIG. 9.

At 1515, the method may include processing, by a first multi-model machine learning application that is a combination of the backbone model and the first task-specific model, one or more signals received from the base station to generate one or more outputs. The operations of 1515 may be performed in accordance with examples as disclosed herein. In some examples, aspects of the operations of 1515 may be performed by a processor 930 as described with reference to FIG. 9.

At 1520, the method may include communicating, with the base station or a wireless device, a first message based on the one or more outputs. The operations of 1520 may be performed in accordance with examples as disclosed herein. In some examples, aspects of the operations of 1520 may be performed by a transmit circuitry 935 as described with reference to FIG. 9.

Figure 16:
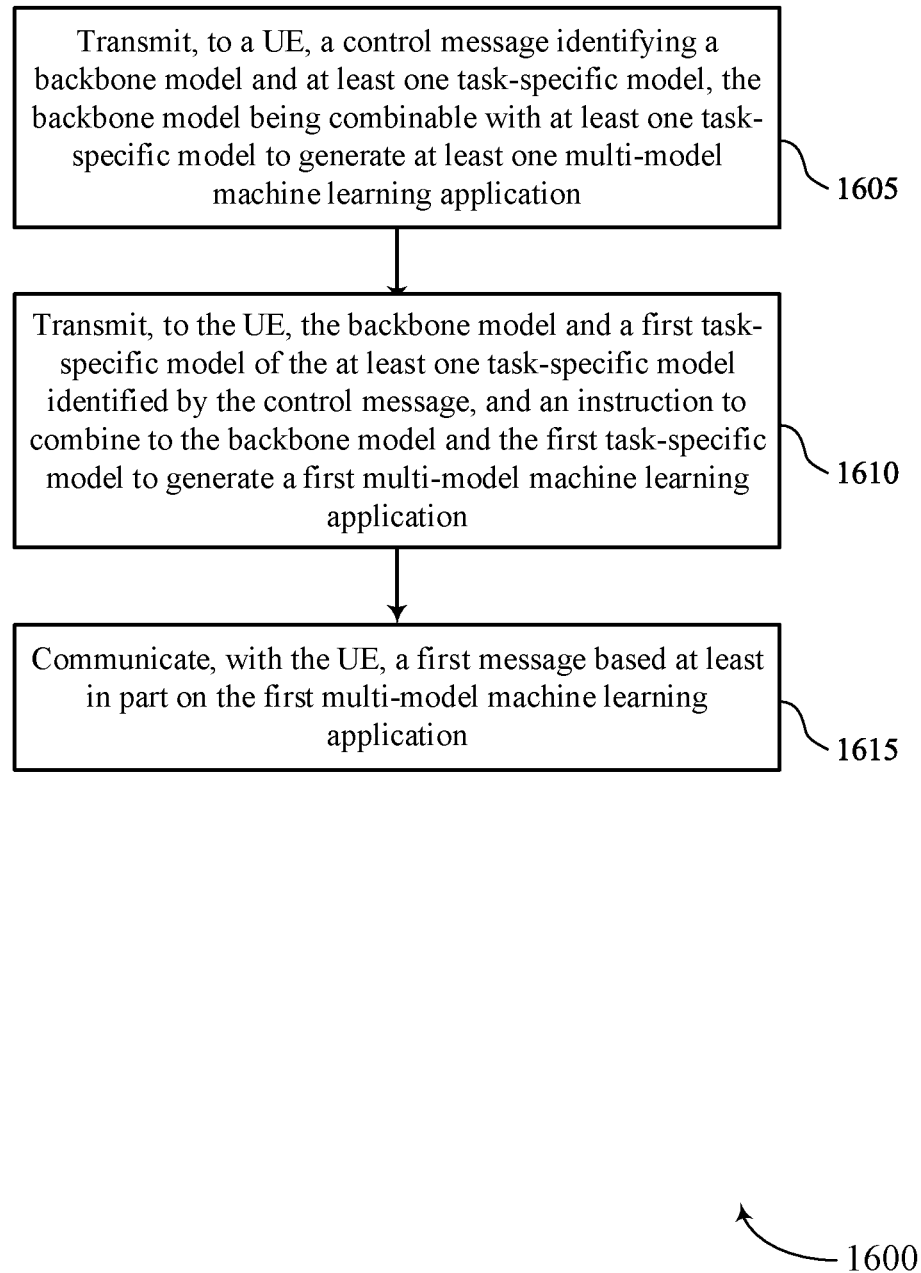

FIG. 16 shows a flowchart illustrating a method 1600 that supports configuring a multi-model machine learning application in accordance with aspects of the present disclosure. The operations of the method 1600 may be implemented by a base station or its components as described herein. For example, the operations of the method 1600 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a control message identifying a backbone model and at least one task-specific model, the backbone model being combinable with the at least one task-specific model to generate at least one multi-model machine learning application. The operations of 1605 may be performed in accordance with examples as disclosed herein. In some examples, aspects of the operations of 1605 may be performed by a backbone module 1325 as described with reference to FIG. 13.

At 1610, the method may include transmitting, to the UE, the backbone model and a first task-specific model of the at least one task-specific model identified by the control message, and an instruction to combine to the backbone model and the first task-specific model to generate a first multi-model machine learning application. The operations of 1610 may be performed in accordance with examples as disclosed herein. In some examples, aspects of the operations of 1610 may be performed by a task-specific module 1330 as described with reference to FIG. 13.

At 1615, the method may include communicating, with the UE, a first message based on the first multi-model machine learning application. The operations of 1615 may be performed in accordance with examples as disclosed herein. In some examples, aspects of the operations of 1615 may be performed by a transmit circuitry 1335 as described with reference to FIG. 13.

The following provides an overview of aspects of the present disclosure:

Aspect 1: A method for wireless communication at a UE, comprising: receiving, from a base station, a control message identifying a backbone model and at least one task-specific model, the backbone model being combinable with the at least one task-specific model to generate at least one multi-model machine learning application; receiving, from the base station, the backbone model and a first task-specific model of the at least one task-specific model identified by the control message; processing, by a first multi-model machine learning application that is a combination of the backbone model and the first task-specific model, one or more signals received from the base station to generate one or more outputs; and communicating, with the base station or a wireless device, a first message based at least in part on the one or more outputs.

Aspect 2: The method of aspect 1, wherein receiving the control message comprises: receiving the control message identifying a backbone model configuration indicating a plurality of scenarios, conditions, or tasks in which to apply the backbone model and a task-specific configuration for the first task-specific model indicating a first scenario, condition, or task of the plurality of scenarios, conditions, or tasks in which to combine the first task-specific model with the backbone model to generate the first multi-model machine learning application.

Aspect 3: The method of any of aspects 1 through 2, further comprising: receiving, in the control message, at least one indication of a plurality of task-specific models and one or more scenarios, conditions, or tasks for combining a respective task-specific model with the backbone model; receiving the plurality of task-specific models from the base station identified in the control message; and communicating the first message based at least in part on a detected scenario, condition, or task indicating to combine the first task-specific model with the backbone model to generate the first multi-model machine learning application.

Aspect 4: The method of aspects 1, further comprising: receiving an update control message identifying a second task-specific model that is combinable with the backbone model for generating a second multi-model machine learning application; receiving, from the base station, the second task-specific model identified in the update control message; processing, by the second multi-model machine learning application that is a combination of the backbone model and the second task-specific model, one or more second signals received from the base station to generate one or more second outputs; and communicating a second message based at least in part on one or more second outputs.

Aspect 5: The method of any of aspects 1 through 4, further comprising: receiving a second backbone model from the base station or a second base station and an indication that the second backbone model is combinable with a second task-specific model; processing, by a second multi-model machine learning application that is a combination of the second backbone model and the second task-specific model, one or more second signals received from the base station or the second base station to generate one or more second outputs; and communicating a second message based at least in part on one or more second outputs.

Aspect 6: The method of aspect 5, further comprising: transmitting a request for the second backbone model based at least in part on detecting a change in one or more conditions, one or more tasks, one or more scenarios, or any combination thereof.

Aspect 7: The method of any of aspects 5 through 6, further comprising: receiving the second task-specific model from the base station or the second base station.

Aspect 8: The method of aspect 7, further comprising: transmitting a request for the second task-specific model based at least in part on detecting a change in one or more conditions, one or more tasks, one or more scenarios, or any combination thereof.

Aspect 9: The method of any of aspects 1 through 8, wherein receiving the control message comprises: receiving a first control message comprising a backbone model configuration for the backbone model; and receiving a second control message comprising a task-specific configuration for the first task-specific model, wherein the one or more signals are processed by the first multi-model machine learning application in accordance with the backbone model configuration and the task-specific configuration.

Aspect 10: The method of any of aspects 1 through 3, wherein the control message comprises an index for the backbone model, the method further comprising: determining that the first task-specific model is compatible with the backbone model based at least in part on the index for the backbone model.

Aspect 11: The method of any of aspects 1 and 4 through 9, wherein the control message indicates a task list supported by the backbone model, the method further comprising: processing, by the first multi-model machine learning application, one or more second signals received from the base station to generate one or more second outputs corresponding to a task from the supported task list.

Aspect 12: The method of aspect 11, wherein the task list indicates at least one mobility task, at least one beam management task, or any combination thereof.

Aspect 13: The method of any of aspects 1 and 4 through 12, wherein the control message indicates a scenario list supported by the backbone model, the method further comprising: processing, by the first multi-model machine learning application, one or more second signals received from the base station to generate one or more second outputs corresponding to a scenario from the supported scenario list.

Aspect 14: The method of aspect 13, wherein the scenario list indicates at least one cell index, at least one doppler range index, at least one speed index, at least one bandwidth index, at least one port index, or any combination thereof.

Aspect 15: The method of any of aspects 1 through 14, further comprising: transmitting a backbone model update request to the base station or a second base station based at least in part on detecting a scenario, a condition, or a task that is unsupported by the backbone model; receiving a second backbone model and a second task-specific model based at least in part on the backbone model update request; processing, by a second multi-model machine learning application that is a combination of the second backbone model and the second task-specific model, one or more second signals received from the base station or the second base station to generate one or more second outputs; and communicating a second message based at least in part on one or more second outputs.

Aspect 16: The method of any of aspects 1 through 15, wherein receiving the control message comprises: receiving the control message indicating a set of one or more application types supported by the backbone model, a set of one or more tasks supported by the backbone model, a set of one or more conditions for using the backbone model, one or more time periods for using the backbone model, or a combination thereof.

Aspect 17: The method of any of aspects 1 through 16, wherein processing the one or more signals comprises: processing, using the backbone model, a reference signal or an estimated channel to generate one or more intermediate outputs; and processing, using the first task-specific model, the one or more intermediate outputs to generate the one or more outputs.

Aspect 18: The method of any of aspects 1 through 17, wherein receiving the backbone model and the first task-specific model comprises: receiving an indication of a first structure for the backbone model and a first set of one or more parameters corresponding to the first structure and an indication of a second structure for the first task-specific model and a second set of one or more parameters corresponding to the second structure.

Aspect 19: The method of any of aspects 1 through 18, further comprising: receiving control signaling activating the backbone model and the first task-specific model.

Aspect 20: The method of any of aspects 1 through 19, wherein transmitting the control message comprises: transmitting the control message indicating a set of one or more application types supported by the backbone model, a set of one or more tasks supported by the backbone model, a set of one or more conditions for using the backbone model, one or more time periods for using the backbone model, or a combination thereof.

Aspect 21: The method of any of aspects 1 through 20, wherein transmitting the backbone model and the first task-specific model comprises: transmitting an indication of a first structure for the backbone model and a first set of one or more parameters corresponding to the first structure and an indication of a second structure for the first task-specific model and a second set of one or more parameters corresponding to the second structure.

Aspect 22: A method for wireless communication at a base station, comprising: transmitting, to a UE, a control message identifying a backbone model and at least one task-specific model, the backbone model being combinable with the at least one task-specific model to generate at least one multi-model machine learning application; transmitting, to the UE, the backbone model and a first task-specific model of the at least one task-specific model identified by the control message, and an instruction to combine to the backbone model and the first task-specific model to generate a first multi-model machine learning application; communicating, with the UE, a first message based at least in part on the first multi-model machine learning application.

Aspect 23: The method of aspect 22, wherein transmitting the control message comprises: transmitting the control message identifying a backbone model configuration indicating a plurality of scenarios or tasks in which to apply the backbone model and a task-specific configuration for the first task-specific model indicating a first scenario or task of the plurality of scenarios or tasks in which to combine the first task-specific model with the backbone model to generate the first multi-model machine learning application.

Aspect 24: The method of any of aspects 22 through 23, further comprising: transmitting an update control message identifying a second task-specific model that is combinable with the backbone model for generating a second multi-model machine learning application; transmitting, to the UE, the second task-specific model identified in the update control message.

Aspect 25: The method of any of aspects 22 through 24, further comprising: transmitting, in the control message, at least one indication of a plurality of task-specific models and one or more conditions for combining a respective task-specific model with the backbone model; transmitting the plurality of task-specific models from the base station identified in the control message; and communicating the first message based at least in part on a detected condition indicating to combine the first task-specific model with the backbone model to generate the first multi-model machine learning application.

Aspect 26: The method of any of aspects 22 through 25, further comprising: transmitting a second backbone model to the UE and an indication that the second backbone model is combinable with a second task-specific model.

Aspect 27: The method of any of aspects 22 through 26, wherein transmitting the control message comprises: transmitting a first control message comprising a backbone model configuration for the backbone model; and transmitting a second control message comprising a task-specific configuration for the first task-specific model.

Aspect 28: The method of any of aspects 22 through 27, further comprising: receiving a backbone model update request based at least in part on detection of a scenario, a condition, or a task that is unsupported by the backbone model; transmitting a second backbone model and a second task-specific model based at least in part on the backbone model update request.

Aspect 29: An apparatus for wireless communication at a UE, comprising a processor; memory coupled with the processor; and instructions stored in the memory and executable by the processor to cause the apparatus to perform a method of any of aspects 1 through 21.

Aspect 30: An apparatus for wireless communication at a UE, comprising at least one means for performing a method of any of aspects 1 through 21.

Aspect 31: A non-transitory computer-readable medium storing code for wireless communication at a UE, the code comprising instructions executable by a processor to perform a method of any of aspects 1 through 21.

Aspect 32: An apparatus for wireless communication at a base station, comprising a processor; memory coupled with the processor; and instructions stored in the memory and executable by the processor to cause the apparatus to perform a method of any of aspects 22 through 28.

Aspect 33: An apparatus for wireless communication at a base station, comprising at least one means for performing a method of any of aspects 22 through 28.

Aspect 34: A non-transitory computer-readable medium storing code for wireless communication at a base station, the code comprising instructions executable by a processor to perform a method of any of aspects 22 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, a control message identifying a backbone model and at least one task-specific model, the backbone model being combinable with the at least one task-specific model to generate at least one multi-model machine learning application;
   receiving, from the base station, the backbone model and a first task-specific model of the at least one task-specific model identified by the control message;
   processing, by a first multi-model machine learning application that is a combination of the backbone model and the first task-specific model, one or more signals received from the base station to generate one or more outputs; and
   communicating, with the base station or a wireless device, a first message based at least in part on the one or more outputs.

2. The method of claim 1, wherein receiving the control message comprises:
   receiving the control message identifying a backbone model configuration indicating a plurality of scenarios, conditions, or tasks in which to apply the backbone model and a task-specific configuration for the first task-specific model indicating a first scenario, condition, or task of the plurality of scenarios, conditions, or tasks in which to combine the first task-specific model with the backbone model to generate the first multi-model machine learning application.

3. The method of claim 1, further comprising:
   receiving, in the control message, at least one indication of a plurality of task-specific models and one or more scenarios, conditions, or tasks for combining a respective task-specific model with the backbone model;
   receiving the plurality of task-specific models from the base station identified in the control message; and
   communicating the first message based at least in part on a detected scenario, condition, or task indicating to combine the first task-specific model with the backbone model to generate the first multi-model machine learning application.

4. The method of claim 1, further comprising:
   receiving an update control message identifying a second task-specific model that is combinable with the backbone model for generating a second multi-model machine learning application;
   receiving, from the base station, the second task-specific model identified in the update control message;
   processing, by the second multi-model machine learning application that is a combination of the backbone model and the second task-specific model, one or more second signals received from the base station to generate one or more second outputs; and
   communicating a second message based at least in part on one or more second outputs.

5. The method of claim 1, further comprising:
   receiving a second backbone model from the base station or a second base station and an indication that the second backbone model is combinable with a second task-specific model;
   processing, by a second multi-model machine learning application that is a combination of the second backbone model and the second task-specific model, one or more second signals received from the base station or the second base station to generate one or more second outputs; and communicating a second message based at least in part on one or more second outputs.

6. The method of claim 5, further comprising:

transmitting a request for the second backbone model, the second task-specific model, or both based at least in part on detecting a change in one or more conditions, one or more tasks, one or more scenarios, or any combination thereof.

7. The method of claim 1, wherein receiving the control message comprises:

receiving a first control message comprising a backbone model configuration for the backbone model; and receiving a second control message comprising a task-specific configuration for the first task-specific model, wherein the one or more signals are processed by the first multi-model machine learning application in accordance with the backbone model configuration and the task-specific configuration.

8. The method of claim 1, wherein the control message comprises an index for the backbone model, the method further comprising:

determining that the first task-specific model is compatible with the backbone model based at least in part on the index for the backbone model.

9. The method of claim 1, wherein the control message indicates a task list supported by the backbone model, a scenario list supported by the backbone model, or a combination thereof, the method further comprising:

processing, by the first multi-model machine learning application, one or more second signals received from the base station to generate one or more second outputs corresponding to a task from the supported task list, corresponding to a scenario from the supported scenario list, or both.

10. The method of claim 1, further comprising:

transmitting a backbone model update request to the base station or a second base station based at least in part on detecting a scenario, a condition, or a task that is unsupported by the backbone model;

receiving a second backbone model and a second task-specific model based at least in part on the backbone model update request;

processing, by a second multi-model machine learning application that is a combination of the second backbone model and the second task-specific model, one or more second signals received from the base station or the second base station to generate one or more second outputs; and communicating a second message based at least in part on one or more second outputs.

11. An apparatus for wireless communication at a user equipment (UE), comprising:

a processor;

memory coupled with the processor; and instructions stored in the memory and executable by the processor to cause the apparatus to:

receive, from a base station, a control message identifying a backbone model and at least one task-specific model, the backbone model being combinable with the at least one task-specific model to generate at least one multi-model machine learning application;

receive, from the base station, the backbone model and a first task-specific model of the at least one task-specific model identified by the control message;

process, by a first multi-model machine learning application that is a combination of the backbone model and the first task-specific model, one or more signals received from the base station to generate one or more outputs; and communicate, with the base station or a wireless device, a first message based at least in part on the one or more outputs.

12. The apparatus of claim 11, wherein the instructions to receive the control message are executable by the processor to cause the apparatus to:

receive the control message identifying a backbone model configuration indicating a plurality of scenarios, conditions, or tasks in which to apply the backbone model and a task-specific configuration for the first task-specific model indicating a first scenario, condition, or task of the plurality of scenarios, conditions, or tasks in which to combine the first task-specific model with the backbone model to generate the first multi-model machine learning application.

13. The apparatus of claim 11, wherein the instructions are further executable by the processor to cause the apparatus to:

receive, in the control message, at least one indication of a plurality of task-specific models and one or more scenarios, conditions, or tasks for combining a respective task-specific model with the backbone model;

receive the plurality of task-specific models from the base station identified in the control message; and communicate the first message based at least in part on a detected scenario, condition, or task indicating to combine the first task-specific model with the backbone model to generate the first multi-model machine learning application.

14. The apparatus of claim 11, wherein the instructions are further executable by the processor to cause the apparatus to:

receive an update control message identifying a second task-specific model that is combinable with the backbone model for generating a second multi-model machine learning application;

receive, from the base station, the second task-specific model identified in the update control message;

process, by the second multi-model machine learning application that is a combination of the backbone model and the second task-specific model, one or more second signals received from the base station to generate one or more second outputs; and communicate a second message based at least in part on one or more second outputs.

15. The apparatus of claim 11, wherein the instructions are further executable by the processor to cause the apparatus to:

receive a second backbone model from the base station or a second base station and an indication that the second backbone model is combinable with a second task-specific model;

process, by a second multi-model machine learning application that is a combination of the second backbone model and the second task-specific model, one or more second signals received from the base station or the second base station to generate one or more second outputs; and communicate a second message based at least in part on one or more second outputs.

16. The apparatus of claim 15, wherein the instructions are further executable by the processor to cause the apparatus to:

transmit a request for the second backbone model, the second task-specific model, or both based at least in part on detecting a change in one or more conditions, one or more tasks, one or more scenarios, or any combination thereof.

17. The apparatus of claim 11, wherein the instructions to receive the control message are executable by the processor to cause the apparatus to:
receive a first control message comprising a backbone model configuration for the backbone model; and
receive a second control message comprising a task-specific configuration for the first task-specific model, wherein the one or more signals are processed by the first multi-model machine learning application in accordance with the backbone model configuration and the task-specific configuration.

18. The apparatus of claim 11, wherein the control message comprises an index for the backbone model, and the instructions are further executable by the processor to cause the apparatus to:
determine that the first task-specific model is compatible with the backbone model based at least in part on the index for the backbone model.

19. The apparatus of claim 11, wherein the control message indicates a task list supported by the backbone model, a scenario list supported by the backbone model, or a combination thereof, and the instructions are further executable by the processor to cause the apparatus to:
process, by the first multi-model machine learning application, one or more second signals received from the base station to generate one or more second outputs corresponding to a task from the supported task list, corresponding to a scenario from the supported scenario list, or both.

20. The apparatus of claim 11, wherein the instructions are further executable by the processor to cause the apparatus to:
transmit a backbone model update request to the base station or a second base station based at least in part on detecting a scenario, a condition, or a task that is unsupported by the backbone model;
receive a second backbone model and a second task-specific model based at least in part on the backbone model update request;
process, by a second multi-model machine learning application that is a combination of the second backbone model and the second task-specific model, one or more second signals received from the base station or the second base station to generate one or more second outputs; and
communicate a second message based at least in part on one or more second outputs.

21. A method for wireless communication at a base station, comprising:
transmitting, to a user equipment (UE), a control message identifying a backbone model and at least one task-specific model, the backbone model being combinable with the at least one task-specific model to generate at least one multi-model machine learning application;
transmitting, to the UE, the backbone model and a first task-specific model of the at least one task-specific model identified by the control message, and an instruction to combine to the backbone model and the first task-specific model to generate a first multi-model machine learning application; and
communicating, with the UE, a first message based at least in part on the first multi-model machine learning application.

22. The method of claim 21, wherein transmitting the control message comprises:
transmitting the control message identifying a backbone model configuration indicating a plurality of scenarios or tasks in which to apply the backbone model and a task-specific configuration for the first task-specific model indicating a first scenario or task of the plurality of scenarios or tasks in which to combine the first task-specific model with the backbone model to generate the first multi-model machine learning application.

23. The method of claim 21, further comprising:
transmitting an update control message identifying a second task-specific model that is combinable with the backbone model for generating a second multi-model machine learning application;
transmitting, to the UE, the second task-specific model identified in the update control message.

24. The method of claim 21, further comprising:
transmitting, in the control message, at least one indication of a plurality of task-specific models and one or more conditions for combining a respective task-specific model with the backbone model;
transmitting the plurality of task-specific models from the base station identified in the control message; and
communicating the first message based at least in part on a detected condition indicating to combine the first task-specific model with the backbone model to generate the first multi-model machine learning application.

25. The method of claim 21, further comprising:
transmitting a second backbone model to the UE and an indication that the second backbone model is combinable with a second task-specific model.

26. The method of claim 21, wherein transmitting the control message comprises:
transmitting a first control message comprising a backbone model configuration for the backbone model; and
transmitting a second control message comprising a task-specific configuration for the first task-specific model.

27. The method of claim 21, further comprising:
receiving a backbone model update request based at least in part on detection of a scenario, a condition, or a task that is unsupported by the backbone model;
transmitting a second backbone model and a second task-specific model based at least in part on the backbone model update request.

28. The method of claim 21, wherein transmitting the control message comprises:
transmitting the control message indicating a set of one or more application types supported by the backbone model, a set of one or more tasks supported by the backbone model, a set of one or more conditions for using the backbone model, one or more time periods for using the backbone model, or a combination thereof.

29. The method of claim 21, wherein transmitting the backbone model and the first task-specific model comprises:
transmitting an indication of a first structure for the backbone model and a first set of one or more parameters corresponding to the first structure and an indication of a second structure for the first task-specific model and a second set of one or more parameters corresponding to the second structure.

30. An apparatus for wireless communications, comprising:
means for receiving, from a base station, a control message identifying a backbone model and at least one task-specific model, the backbone model being combinable with the at least one task-specific model to generate at least one multi-model machine learning application;

means for receiving, from the base station, the backbone model and a first task-specific model of the at least one task-specific model identified by the control message;

means for processing, by a first multi-model machine learning application that is a combination of the backbone model and the first task-specific model, one or more signals received from the base station to generate one or more outputs; and means for communicating, with the base station or a wireless device, a first message based at least in part on the one or more outputs.

\* \* \* \* \*